United States Patent

[11] 3,585,600

[72] Inventor Fabrizio Saltini
Modena, Italy
[21] Appl. No. 783,894
[22] Filed Dec. 16, 1968
[45] Patented June 15, 1971
[73] Assignee Inq. C. Olivetti & C. S.P.A. Ivrea
Torino, Italy
[32] Priority Dec. 14, 1967
[33] Italy
[31] 54109-A/67

[54] STORED PROGRAM ELECTRONIC COMPUTER
22 Claims, 11 Drawing Figs.

[52] U.S. Cl. .......... 340/172.5
[51] Int. Cl. .......... G06f 13/00
[50] Field of Search .......... 340/172.5; 235/157

[56] References Cited

UNITED STATES PATENTS

| | | | |
|---|---|---|---|
| 3,116,410 | 12/1963 | Manna et al. | 340/172.5 X |
| 3,238,510 | 3/1966 | Ergott, Jr. | 340/172.5 |
| 3,283,307 | 11/1966 | Vigliante | 340/172.5 |
| 3,292,155 | 12/1966 | Neilson | 340/172.5 |
| 3,328,772 | 6/1967 | Oeters | 340/172.5 |
| 3,345,619 | 10/1967 | Anderson et al. | 340/172.5 |
| 3,351,917 | 11/1967 | Shimabukuro | 340/172.5 |
| 3,354,429 | 11/1967 | Macon et al. | 340/172.5 |
| 3,414,887 | 12/1968 | Scantlin | 340/172.5 |
| 3,490,013 | 1/1970 | Lawrance et al. | 340/172.5 X |
| 3,495,222 | 2/1970 | Perotto et al. | 340/172.5 |

*Primary Examiner*—Raulfe B. Zache
*Attorney*—Birch, Swindler, McKie & Beckett

ABSTRACT: A computer for executing instructions grouped in fixed length macroinstructions having a bulk memory for storing the macroinstructions and data, and an operational delay line memory divisable into a plurality of zones for storing the macroinstruction presently under execution and data being operated upon. Means are provided for transferring macroinstructions and data between the two memories. The macroinstruction under execution can select one of two macroinstructions from the bulk memory to be next executed depending on whether or not a jump condition has occurred. Each macroinstruction contains a label which specifies how the individual instructions contained therein are to be interpreted. The operational memory may be divided into any zone configuration by a division macroinstruction and any one zone may be designated for a use in a particular operation by recording a heading code before it. The computer also includes a plurality of peripheral units including a printer each of which has its own control unit. Program instructions for controlling a peripheral unit are transferred to the respective control unit and executed directly by it so that the main portion of the computer can overlap the execution of following instructions with the peripheral unit instruction execution. The operational memory also includes a zone for storing a subprogram for controlling the horizontal format of the printers.

INVENTOR.
FABRIZIO SALTINI

INVENTOR.
FABRIZIO SALTINI

*INVENTOR.*
FABRIZIO SALTINI

| CODES | LABEL | HORIZ. TAB. ADDRESS | | PAPER CONTROL OPERATION SELECT | JUMP LENGTH | FUNCTION | Z1 FUNCTION | ZONE ADDRESS | | Z2 FUNCTION | ZONE ADDRESS | | Z3 FUNCTION | ZONE ADDRESS | | SHIFT | ZONE CAPACITY |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| 0 | | 15 | 240 | NO | NO | NO | NO | 0 | 0 | NO | 0 | 0 | NO | 0 | 0 | NO | NO |
| 1 | N | 13 | 224 | RD | SC 1.1 | | ◇ | 10 | 1 | + | 10 | 1 | + | 10 | 1 | d1 | - 0 |
| 2 | | 11 | 208 | RS | SC 1.2 | INT | | 20 | 2 | × | 20 | 2 | ÷ | 20 | 2 | d2 | - 1 |
| 3 | | 9 | 192 | RD RS | SC 1.3 | AR INT | * | 30 | 3 | – | 30 | 3 | – | 30 | 3 | d3 | - 2 |
| 4 | | 7 | 176 | T1 | SC 1.4 | | C | 40 | 4 | | 40 | 4 | | 40 | 4 | d4 | - 3 |
| 5 | | 5 | 160 | RD T1 | | AR | \|◇\| | 50 | 5 | \|+\| | 50 | 5 | \|+\| | 50 | 5 | d5 | - 4 |
| 6 | | 3 | 144 | RS TI | | TRC INT | | 60 | 6 | ↑ | 60 | 6 | ↓ | 60 | 6 | d6 | - 5 |
| 7 | | 1 | 128 | RD RS TI | | TRC AR-I | \|*\| | 70 | 7 | \|–\| | 70 | 7 | \|–\| | 70 | 7 | d7 | - 6 |
| S | | 14 | 112 | TS | | | | 80 | 8 | CL | 80 | 8 | CL | 80 | 8 | | - 7 |
| 9 | | 12 | 96 | RD TS | SC S.1 | | ◇ USP | 90 | 9 | | 90 | 9 | SS < | 90 | 9 | s1 | - 8 |
| J | | 10 | 80 | RS TS | SC S.2 | | USP | 100 | | USP | 100 | | USP | 100 | | s2 | - 9 |
| K | | 6 | 64 | RD RS TS | SC S.3 | | * USP | 110 | | | 110 | | | 110 | | s3 | -10 |
| L | | 6 | 48 | TI TS | SC S.4 | | | 120 | | | 120 | | | 120 | | s4 | -11 |
| M | | 4 | 32 | 2D TI TS | | | \|◇\| USP | 130 | | | 130 | | | 130 | | s5 | -12 |
| N | | 2 | 16 | RS TI TS | | | Mα | 140 N | N | Mα | 140 N | N | Mα | 140 N | N | s6 | -13 |
| / | | 0 | 0 | RD RS TI TS | | | \|*\| USP | 150 | | | 150 | | | 150 | | s7 | -14 |
| CEL | 1 | 2 | 3 | 4 | 5 | 6 | 7 | 8 | 9 | 10 | 11 | 12 | 13 | 14 | 15 | 16 | 17 |

Fig.3a

Fig.3

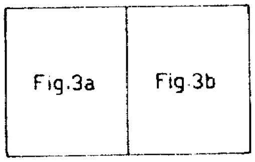

INVENTOR.
FABRIZIO SALTINI

| AUX. MEM. TRANS. | | | PRINT SELECT | METHOD | KEY BD. SELECT | | JUMP | | JUMP ADDRESS | | | NORMAL ADDRESS | | | CODES |
|---|---|---|---|---|---|---|---|---|---|---|---|---|---|---|---|
| TRACK ADDRESS | BLOCK ADDRESS | | PRINT SELECT | METHOD | KEY BD | COMMANDS | TEST | CONDITIONS | TRACK | BLOCK | | TRACK | BLOCK | | CODES |
| 18 | 19 | 20 | 21 | 22 | 23 | 24 | 25 | 26 | 27 | 28 | 29 | 30 | 31 | 32 | |
| NO | 0 0 | 0 | NO | NO | NO | NO | NO | NO | NO | 0 0 | 0 | X | 0 0 | 0 | 0 |
| READING P1 | 10 1 | 1 | SN | E | TN | B | FF | FF | P1 | 10 1 | 1 | P1 | 10 1 | 1 | 1 |
| READING P2 | 20 2 | 2 | | SZ | Tα | TRC | | | P2 | 20 2 | 2 | P2 | 20 2 | 2 | 2 |
| READING P3 | 30 3 | 3 | | | | B TRC | | | P3 | 30 3 | 3 | P3 | 30 3 | 3 | 3 |
| READING P4 | 40 4 | 4 | | | LSB | | BR | BR | P4 | 40 4 | 4 | P4 | 40 4 | 4 | 4 |
| READING P5 | 50 5 | 5 | SR | ESP | | CP B | BV | BV | P5 | 50 5 | 5 | F5 | 50 5 | 5 | 5 |
| READING P6 | 60 6 | 6 | | SP | | | BB | BB | P6 | 60 6 | 6 | P6 | 60 6 | 6 | 6 |
| LE P2 | 70 7 | 7 | | | | B CP TRC | CP | CP | P7 | 70 7 | 7 | P7 | 70 7 | 7 | 7 |
| | 80 8 | 8 | | | L1 | | R | R | | 80 8 | 8 | | 80 8 | 8 | 8 |
| RECORDING P1 | 90 9 | 9 | | | L1 TN | R B | Z1 = | Z1 = | | 90 9 | 9 | | 90 9 | 9 | 9 |
| RECORDING P2 | 100 10 | 160 | | | L1 Tα | | Z1 < | Z1 < | | 100 10 | 160 | | 100 10 | 160 | J |
| RECORDING P3 | 110 11 | 176 | | | | R B TRC | Z2 ov | Z2 ov | | 110 11 | 176 | | 110 11 | 176 | K |
| RECORDING P4 | 120 12 | 192 | | | L2 | | Z3 ov | Z3 ov | TP | 120 12 | 192 | TP | 120 12 | 192 | L |
| RECORDING P5 | 130 13 | 208 | | | L2 TN | | Z3 = | Z3 = | | 130 13 | 208 | | 130 13 | 208 | M |
| RECORDING P6 | 140 14 | 224 | | | L2 Tα | | Z3 < | Z3 < | | 140 14 | 224 | | 140 14 | 224 | N |
| RECORDING P6 | N | N | | | | | | | N | N | N | N | N | N | N |
| LE P3 | 150 15 | 240 | | | | R TRC B CP | CR | | CB | 150 15 | 240 | CB | 150 15 | 240 | / |
| 18 | 19 | 20 | 21 | 22 | 23 | 24 | 25 | 26 | 27 | 28 | 29 | 30 | 31 | 32 | CEL |

Fig.3b

INVENTOR.
FABRIZIO SALTINI

INVENTOR.
FABRIZIO SALTINI

INVENTOR.
FABRIZIO SALTINI

PATENTED JUN 15 1971 3,585,600

INVENTOR.
FABRIZIO SALTINI

INVENTOR.
FABRIZIO SALTINI

INVENTOR.
FABRIZIO SALTINI

STORED PROGRAM ELECTRONIC COMPUTER

CROSS REFERENCE TO RELATED APPLICATION

Applicant claims priority from corresponding Italian patent application Ser. No. 54,109–A/67, filed Dec. 14, 1967.

BACKGROUND OF THE INVENTION

1. Field of the Invention

The invention relates to a stored-program electronic computer in which the program comprises a sequence of instructions each adapted to control an arithmetical operation, a transfer, or other basic operation, and concerns particularly, but not exclusively, accounting machines or low-cost data processing machines in general in which the output of the data takes place predominantly by printing on documents having a direct accounting significance and the input of the data takes place predominantly by entering the same on keyboards.

2. Description of the Prior Art

The program devices of known machines of this type are generally constituted by mechanical stores or by other equivalent semifixed stores, so that the flexibility of programming and the length and number of programs available are inadequate for complex processing operations. Some accounting machines are equipped with a program store of the electronic type: for example, comprising magnetic cores, and substantially repeat the structure of large data processers, in which a single, big, fast store, constituting the working store directly connected to the arithmetical and logic units, is adapted to contain both the data to be processed and the program. In view of the high cost, the complexity and the sensitiveness of these electronic stores, it is impossible in practice to achieve a satisfactory compromise between total cost and efficiency of the machine, and adequate lengths of the programs that can be stored.

It is moreover known that in some accounting machines there is associated with a fast, but small capacity, internal or working store a slow, but more capacious, external store adapted to contain the programs and, if necessary, the data. In this type of known machine, the component instructions and the programs contained in the external store are transferred to the internal store one at a time or in sequences constituting programs corresponding to certain typical elementary accounting operations or cycles. This transfer of the instructions or sequences of instructions from the external store to the internal store generally takes place in the order in which the instructions are recorded in the external store. In other cases, the transfer of the sequence takes place by selection, controlled by the operator, of the sequence of instructions corresponding to the accounting work to be carried out. It follows that this type of machine, while having a large number of instructions available in the external store, has in reality poor programming flexibility and potential, inasmuch as the linking between the successive instructions of the program is either substantially rigid or nonexistent.

Similarly, in large data processers, it is known to use large capacity external stores, for example of the magnetic tape type, for storing long programs; that part of a program which is to be carried out little by little being fed from time to time into the fast internal store. In these processers, however, the individual parts of a program transferred in this way do not have any individual significance, being purely successive pieces of a program, or they have the significance of programs or subprograms themselves.

In other words, in known machines and data processers to which reference has been made, the external program store is purely a mass store which does not permit the internal store any logic operation on the individual parts of a program, so that the programming flexibility and potential still depend substantially on the capacity, that is on the cost, of the fast internal store.

SUMMARY OF THE INVENTION

In carrying out the invention there is provided a computer for executing a program made up of a series of instructions grouped into fixed length macroinstructions comprising an operational memory divisable into a selectable plurality of zones for storing the macroinstruction being executed and data to be operated upon by the macroinstruction and means for interpreting the portions of the macroinstruction stored in a predetermined set of memory segments for controlling the performance of a plurality of operations. The data stored in a selected zone may be designated for use in a particular operation by the recording of a heading code at the beginning of the zone. Also provided is a second memory for storing the macroinstructions of the program and the data to be operated upon and means for selectively transferring instruction and data between the two memories. Each macroinstruction includes a label portion for specifying the particular group of instructions which make it up. Also provided are a plurality of peripheral units including a printer each having a control unit, the interpreting means being operative to transfer to the respective control unit program instructions for controlling that peripheral unit and to overlap the execution of following instructions with the execution, by the peripheral unit control unit, of the peripheral unit control instruction. Also included in the operational memory is a zone for storing a subprogram for controlling the printer.

BRIEF DESCRIPTION OF THE DRAWINGS

FIG. 3 shows how FIGS. 3*a* and 3*b* are to be composed.

FIGS. 3*a* and 3*b* show the format of a number of macroinstructions which control the operation of the computer;

DETAILED DESCRIPTION OF THE INVENTION

General Structure of the Computer

The present invention relates to an electronic computer with an internal program formed by blocks of instruction, or macroinstructions, each of which contains instructions controlling internal and external operations in the sequence most suitable for processing the information appearing in a given account document.

Figure 1:
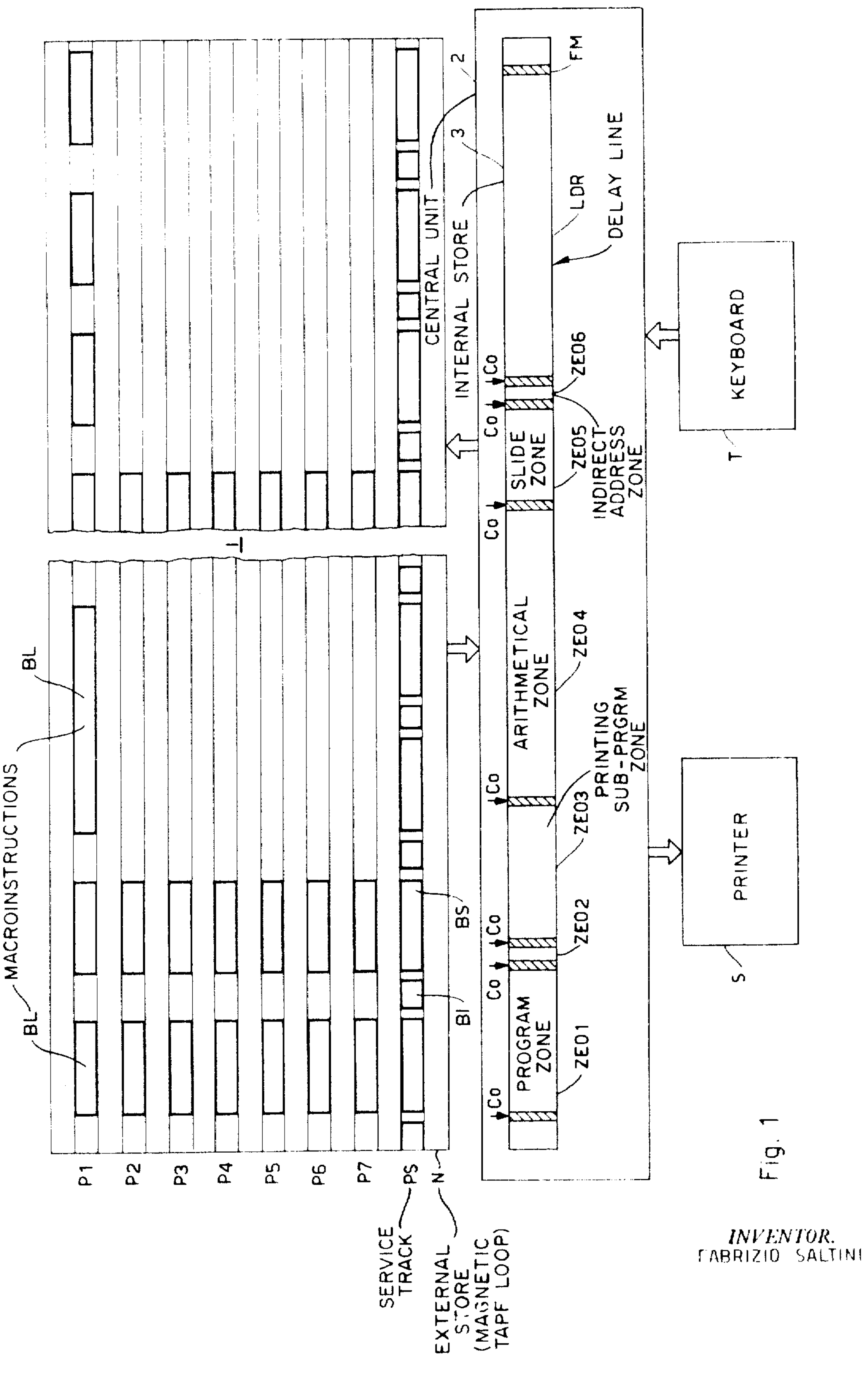
FIG. 1 shows diagrammatically the main parts, especially the magnetic-tape store, used in the embodiment of the computer according to the invention.

FIG. 1 shows the basic system formed by an external store 1 comprising a magnetic tape N, which contains data and a program, a central unit 2 which processes and carries out the individual macroinstructions after transferring them to the internal store 3, a printer S and a keyboard T.

This basic system may be extended by adding the following peripheral units:

- punched card reader;
- perforated tape reader;
- reader for written documents with characters CMC7;
- card punching machine;
- tape perforator;
- unit for forms with magnetic strip;
- line control for data transmission.

The external store N is formed by a ring of magnetic tape on which the items of information are recorded in series in a certain number of tracks P1—P7, each of which is adapted to contain a predetermined number of blocks BL of fixed length. Each block can be identified by means of an address B1 precorded on service track PS and positioned at the beginning of block BL.

Each reading or recording order produces the advance of the tape for identification of the block and the reading or recording of such block; the end of a block is followed by stopping movement of the tape.

The program recorded on the tape is composed of macroinstructions in dislocated arrangement in the store in accordance with a sequence of addresses which minimizes the time of access to the individual blocks in the processing phase. During the working out of the program, the macroinstructions are read and transferred to a predetermined program register ZEO1 of store 3 of central unit 2, which is capable of containing one macroinstruction at a time.

The reading and execution of certain macroinstructions produces in turn the exchange of information between tape store N and the internal store 3 of the computer. This transfer may take place for a variable length and engage a plurality of addresses of the tape store.

Each macroinstruction addresses the reading of the following one in accordance with a sequence subordinated to the result of the examination of internal and external conditions. The tape store may consist of an interchangeable magnetic tape cartridge.

Each macroinstruction being executed in the internal store 3 addresses the reading from the tape store N of the following macroinstruction. The particular macroinstruction which is next addressed depends on whether a jump condition specified in an instruction of the macroinstruction presently being executed occurs. If a jump condition occurs which corresponds to a jump instruction of the present macroinstruction, a different macroinstruction is next transferred to the internal store than if one doesn't occur. Thus there is provided a jump capability in the transfer of instructions from the external to the internal store instead of just within the internal store as in other computers.

This capability effectively makes the tape store an interchangeable part of the working store of the computer.

The Internal Delay-Line Store

Internal store 3 is formed by a single magnetostrictive delay line LDR which stores in series the bits of the information stored. The delay line is closed on registers of bistable type which convert groups of six bits of information corresponding to a character from series to parallel and from parallel to series.

More particularly, each character is formed by two tag bits and four code bits. The latter are operated on in parallel at each period of a character generated every six bit periods. Store LDR contains a certain number of fixed zones of predetermined capacity and position, while the remainder can be subdivided into zones of variable length. The zones are adjacent to one another and each of them contains *n* cells C1–C*n* (with *n* being variable from zone to zone as hereafter described) plus a leading cell C*o* identifying the beginning of the zone.

Each cell is formed by six binary places B1—B6. The first place B1 is used to contain a beginning-of-zone bit B1 in the leading cell C*o*. The second place B2 is used to contain a marker bit B2 which has the function of identifying an individual cell during certain operations in order to distinguish it from the adjacent cells, this bit B2 being equal, within each zone, to one in correspondence with the cell to be identified. The remaining places B3—B6 are used to contain four bits B3—B6 which have the significance of information and are differently interpreted depending on the cell and the zone containing them, as specified hereafter.

The subdivision of store LDR into zones is effected by a succession of operations which begin, at switching on of the machine, with the creation of a first zone with a length of 1+32 cells defined by two beginning-of-zone bits B1 disposed in the first and 34th cells respectively, and the writing of an end-of-store character FM located in the last cell of the store.

In consequence of the initial conditions which are created at switching on, a "store division" macroinstruction located at a fixed address of the tape store N is transferred to the first zone.

The execution of this initial division macroinstruction produces the division of the delay line into the following zones:

1. Program zone: ZEO1 with a length of 1+32 cells (the first is the leading cell C*o*) and intended to receive the successive macroinstructions of the program one at a time. The macroinstruction transferred from time to time from tape store N to zone ZE01 is then automatically carried out, as will be seen hereinafter;
2. Address zone: ZE02 with a length of 1+2 cells which are used to store a two-character address;
3. Printing subprogram zone: ZE03 with a length of 1+32 cells, in which zone there is stored a block containing instructions and data having the function of a printing subprogram;
4. Arithmetical zone: ZE04 with a length of 1+64 cells, which represent an arithmetical register for carrying out computation operations. This zone contains two registers A and B each consisting of 32 cells.
5. Slide zone: ZE05 which may have a length of from 1+3 to 1+15 cells and which is used to receive the digital data entered from the keyboard.
6. Indirect address zone: ZE06 with a length of 1+3 cells which is used to contain a three-character address.

The remaining portion of store LDR is left undivided by the effect of the performance of the initial division macroinstruction.

At any point during the execution of a program, it is moreover possible to insert further division macroinstructions, whose performance produces the subdivision of the said remaining portion (whether this is still undivided or already divided) into zones adapted to contain alphabetical and numerical data. More particularly, the further division macroinstruction may split the remaining portion into a number of zones less than or equal to 153, the length of each zone and the number of zones being determined by the macroinstruction itself.

Each data zone may be intended to contain numerical or alphabetical characters. A numerical and alphabetical character occupy one and two adjacent cells respectively of store LDR.

The numerical information therefore engages as many store cells as there are digits of which the information is composed, plus one leading cell; the alphabetical information, on the other hand, occupies as many pairs of store cells as there are characters of which it is composed plus two leading cells. The distinction between numerical zones and alphabetical zones is therefore determined by the fact that the first have only one leading cell, while the second have two leading cells. Alphabetical zones can contain numerical as well as alphabetical characters.

The information contained in an individual cell assumes different significances and aspects in relation to the various zones to which the cell belongs.

In program zone ZE01 and address zones ZE02 and ZE06, the leading cell contains the sole beginning-of-zone bit *BL*=1, while the following cells each contain, in correspondence with bits B3—B6 a character which indicates a function or part of an address in the internal binary code.

In arithmetical zone ZE04 and slide zone ZE05, the leading cell contains, in addition to the beginning-of-zone bit *B*1=1, a bit *B*6=1 for indicating the minus sign of the operand contained in the same zone, while the other cells contain bits B3—B6 of a binary coded decimal digit.

In printing subprogram zone ZE03, the leading cell contains the beginning-of-zone bit $B1=1$, while the following cells contain, in correspondence with bits B3—B6, characters in the internal code or in any other code according to printing requirements.

In each of the numerical data zones, the leading cell contains the beginning-of-zone bit $B1=1$ while the three binary positions B3—B5 may contain a zone code formed of three bits B3—B5 and adapted to indicate that the zone has been engaged for an internal or external transfer and the binary place B6 contains a bit $B6=1$ for indicating the minus sign of the number contained in the zone.

In each of the alphabetical data zones, the first leading cell, in which the bits B1, B3, B4 and B5 are used as in the numerical data zone, is followed by a second leading cell with the bit $B1=1$. The following cells of the alphabetical zone contain numerical and alphabetical characters in code having seven bits per character, the characters being read as double characters, since the zone is characterized as being alphabetical and numerical.

The identification of the zones in the operations of addressing store LDR takes place by counting the beginning-of-zone bits B1. The two consecutive bits B1 present at the beginning of each alphabetical zone are counted as a single bit.

The data zones of store LDR may moreover be marked by an operation code which is written in the leading cell. The operation code is used to indicate that the zone marked by it is used for operations which link it with a certain part of the machine identified by the operation code.

More particularly, there are four zone operation codes:

1. Internal operations code, used for identifying zones available for transfers between internal devices of the computer;
2. Printing code, used for the zones intended for printing;
3. Keyboard code, used for the zones intended to receive characters from the keyboard;
4. External operations code, used to identify the zones available for transfers from or to tape and from or to other peripheral units. More particularly, in transfers involving the tape store, when there are transferred to store LDR blocks of fixed length having the significance of a "macroinstruction" or a "Printing Subprogram" and therefore intended to be written in zones ZE01 and ZE03 respectively of store LDR, use is not made of any external operation code for identifying said zones. In all other transfers from store LDR to the tape store or vice versa, not only is an external operation code used to indicate the beginning of that part of store LDR which is concerned in the transfer, but also a second external operation code for indicating the end thereof. More particularly, the use of this pair of operation codes defines in store LDR a particular long section which comprises one or more zones, namely all the zones included between the two operation codes. It is therefore clear that the end of a long section is defined by the operation code or leading code which is in front of the first zone of the following section.

Figure 2A:
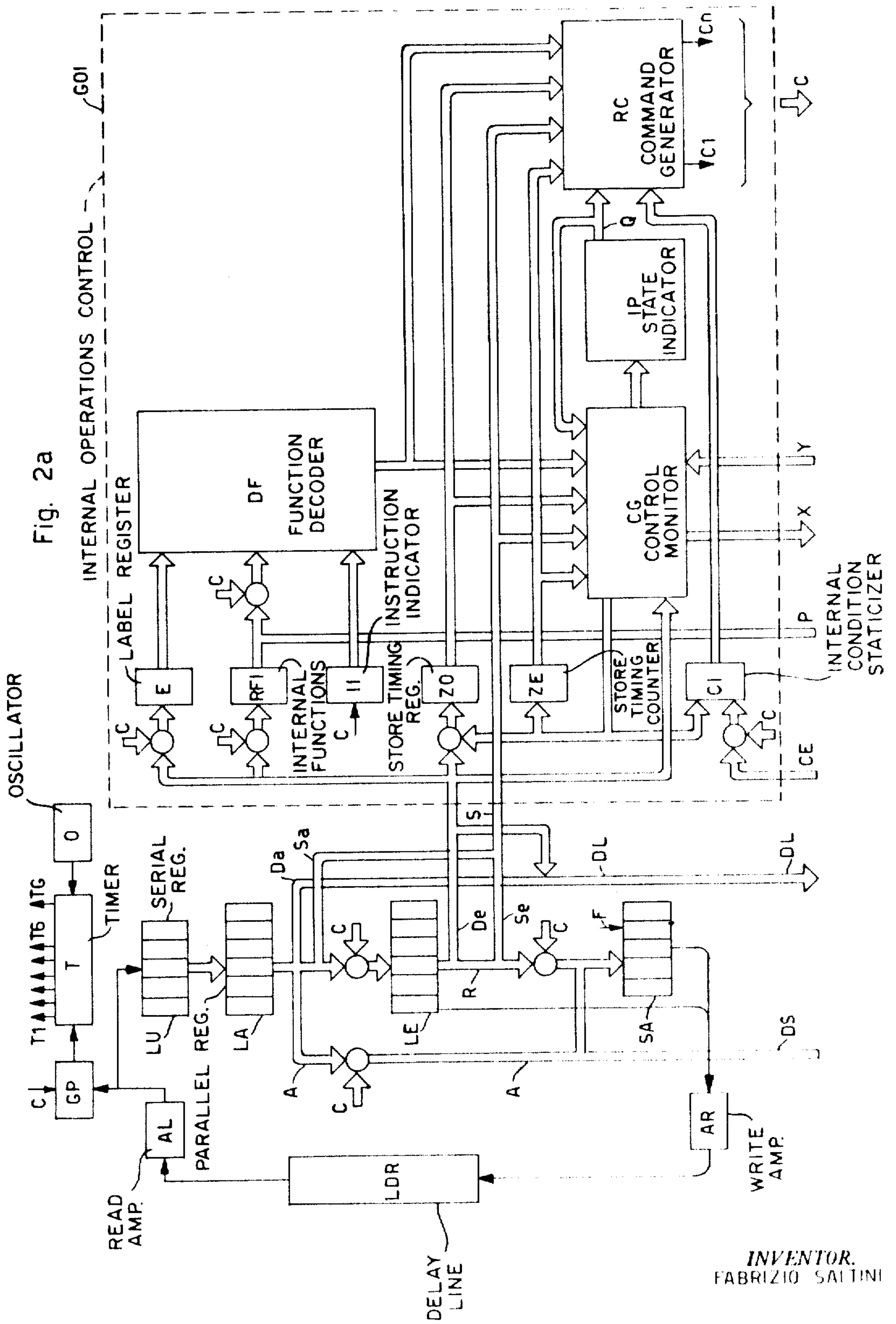
FIGS. 2*a* and 2*b* are block diagrams of the computer.

Delay line store LDR, which can be divided into a certain number of zones as hereinbefore described, is provided (FIG. 2*a*) with a reading transducer feeding a reading amplifier AL and with a writing transducer fed by a writing amplifier AR, between which amplifiers there is interposed a group of four registers LU, LA, LE, SA for the circulation of the data contained in the store.

A timing device T, strobed by oscillator O which is synchronized on the reading of the first bit of the contents of the store, cyclically generates six successive pulses T1—T6 which identify six successive bit periods during which the six bits of character are respectively made available at the output of the amplifier AL, and also generates a pulse TG after every six pulses T1—T6 in correspondence with the pulse T6.

Under the control of timing device T, the first five bits B1—B5 of each character which leave amplifier AL during the pulses T1—T5 respectively are staticized in the five bistable elements of register LU and are therefore transferred, simultaneously with the output of the sixth bit B6 during the pulse T6, to register LA, so that the register LA receives in parallel all six bits B1—B6.

With the pulse TG, which is generated at each pulse T6, the contents of register LA are transferred to register LE.

The same pulse TG transfers bit B1 contained in the first bistable element of register LE to writing amplifier AR and the other bits B2—B6 contained in the remaining bistable elements of register LE to the five bistable elements of register SA. From register SA, bits B2—B6 are delivered in order to amplifier AR at the instants defined by the pulses T1—T5 respectively.

In this way, at each pulse TG, a certain character leaving store LDR is introduced into register LA and remains available therein until the following pulse TG, which transfers it to register LE, where it remains available until the following pulse TG. Therefore, while a character is available in register LA, the character which immediately preceded it in the delay line is available in register LE. This makes it possible to transfer two adjacent characters in the store simultaneously to two different units of the computer. In particular, while the character to be transferred from store LDR to the other internal units of the computer is normally taken from register LE, in the case where, for example, double characters representing an alphabetical character are to be extracted, one of the two component characters is taken from register LA and the other from register LE.

The contents of a generic cell of store LDR may be erased by preventing the transfer thereof along channel R from register LE to register SA; they may be modified by preventing the transfer thereof from register LE to register SA along channel R and, at the same time, permitting the input into register SA of information coming from the internal registers of the computer through channel DS; they may be shifted in advance by one place by transferring register LA to register SA through channel A instead of register LE; and, finally, they may be shifted with a delay by a prefixed number of cells by blocking the input and output of register LE and transferring the contents of register LE to register SA only after the prefixed number of digit periods has elapsed.

Registers LA and LE moreover respectively feed the pairs of channels S*a*, D*a* and S*e*, D*e*. Tag bits B1, B2 and information bits B3—B6, respectively, of the character present in registers LA and LE are transferred along channels S*a*, S*e* and D*a*, D*e*, respectively, from registers LA, LE to the other internal units of the computer.

Description of the Block Diagram of the Computer

The interpretation and execution of each macroinstruction is controlled by sequencing devices which provide for transferring the successive macroinstructions from the tape store to program zone ZE01 of store LDR and, thereafter, for interpreting and executing the individual instructions contained in the macroinstruction present in the program zone.

In particular, the following sequencing devices are provided (FIGS. 2*a* and 2*b*):

1. Internal operations control GOI;
2. Printing control GOS;
3. Keyboard control GOT;
4. Paper services control GSC;
5. Other controls for each of the peripheral units which are added as necessary.

The internal operations control GOI has the function of controlling the performance of the internal operations, that is those operations which do not involve external units such as the keyboard, the printer and all the other peripheral units, with the exception of tape store N. Moreover, this control supervises all of the remaining controls.

Figure 2B:
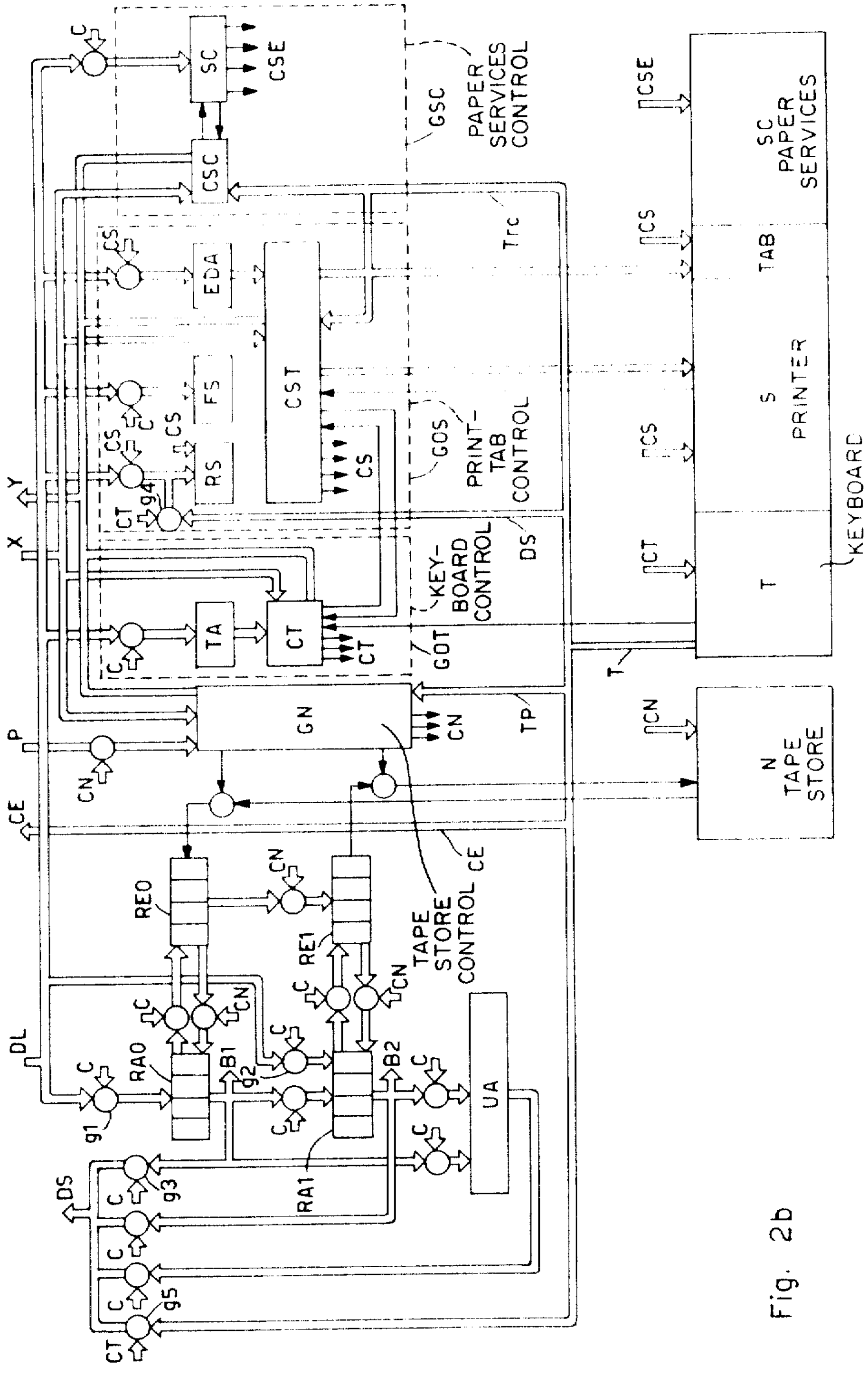

The internal operations control GOI is composed of (FIG. 2*a*):

1. A register E ("label register,") to which there is transferred the first character of the macroinstruction in process of execution at the moment, which is that contained in program zone ZE01. This first character has the function of a label in the sense that it indicates in what way the following characters of the macroinstruction are to be interpreted. The label character remains in the register E for the whole of the time necessary for interpreting and carrying out the corresponding macroinstruction;

2. An instruction indicator I1 which indicates at any instant which of the 32 cells of program zone ZE01 is that in which the instruction in process of interpretation and execution at the moment begins;

3. An internal functions register RFI to which the function character of the internal instruction to be carried out is transferred. This function character remains staticized in the register RFI throughout the time required for interpreting and executing the instruction;

4. A function decoder DF constituted by a logic network which decodes the contents of the label register E, the instruction indicator I1 and the functions register FRI and which supplies an indication of the function corresponding to the current internal instruction;

5. A counter ZE which indicates for the fixed zones ZE01—ZE06 of store LDR, at each reading cycle of the store, the presence in register LE of the characters contained in the cells of each of the said zones. More particularly, counter ZE supplies a continuous signal to the remaining units of the computer at a separate output for each of the first six store zones, this continuous signal lasting, within the limits of each store cycle, for the whole of the time required for reading the corresponding zone;

6. A register ZO indicating the data zone of store LDR which is adapted to interpret, at each store cycle, the operation codes of the leading cell of such zones and, on the basis of the interpretation of the codes, indicates the presence in register LE of characters belonging to each zone provided with corresponding operation code. More particularly, register ZO is provided with a group of outputs each of which corresponds to an operation code and remains operative during each store cycle for the whole of the time required for reading the store zones headed by such code;

7. A group of internal-condition staticizing bistable elements CI which, for example, store conditions resulting from the examination of store zones and, for instance, conditions a number of jump operations;

8. A control monitoring unit CG constituted by a logic network which receives the outputs of function decoder DF, timing register ZO, timing counter ZE, channel S which is the sum of channels *Sa* and *Se* fed by tag bits B1 and B2 of registers LA and LE respectively and, through channel Y, the outputs of the condition indicators of peripheral controls GOT, GOS, GSC, which indicators, as will be seen, are adapted to indicate the state of availability of these controls (FIG. 2*b*).

On the basis of the information received in this way, logic network CG monitors timing counter ZE and timing register ZO and a number of internal condition bistable elements CI linked with the cycle of store LD2. Moreover, logic network OG is adapted, on the basis of the information received at its inputs, to transfer the indications given by controls ZE and register ZO to the peripheral controls on channel X and to command the succession of states which characterize the operation of the computer.

To this end, the logic network CG controls a unit IP indicating states P and which comprises as many bistable elements P1 ... P*n* as there are possible states P1 ... P*n* in which the computer may be, each bistable remaining operative by itself for the whole of the duration of the corresponding state. The unit indicating the states P supplies an indication of the present state to logic network CG through channel Q. On the basis of this indication and of all the other indications which logic network CG receives at its inputs from the various units of the computer, the logic network supplies state indicator IP with an indication of the future state and also a timing signal which determines the change of indicator IP from the present state to the future state.

Moreover, a command generating logic network RC, which is fed with the indications supplied by instruction decoder DF, store timing register ZO, store timing counter ZE, internal condition staticizer CI, state indicator IP and with the indications relating to the position of tag bits B1 and B2 in store LDR and supplied by channel S, generates commands C1—C*n* adapted to define the succession of operations in the various units.

The commands may be, for example:

1. Reading commands, for instance by transfer from registers LE and LA to registers RAO and RA1, in which case the relative commands act by opening gates *g*1 and *g*2 (FIG. 2*b*);

2. Writing commands, for example by transfer from register RAO to register SA, in which case the commands act by opening the gate *g*3;

3. Driving commands for the bistable elements which staticize the internal conditions, in which case the commands act by rendering the bistable elements contained in the staticizer CI operative, 4. Commands for writing characters and tag bits in store LDR, in which case the commands act directly on register SA through channel F.

The internal operations control GOI controls, for example, the following instructions: internal transfers between zones of store LDR carried out through channel DL connecting register LE to register RA1 and channel DS connecting register RA1 to register SA; arithmetical operations carried out by transferring simultaneously to registers RAO and RA1 two digits taken from respective registers LA and LE, arithmetically processing the two digits in computing unit UA and thereafter transferring the result of the arithmetical operation to writing register SA; data-zone heading operations, by generating commands adapted to write the operation code in the leading cell of the addressed zone through the medium of register SA; transfers between store LDR and tape store N carried out through the channels connecting register LE to registers RAO and RA1, registers RAO and RA1 to the registers REO and RE1, and registers REO and RE1 to tape store N.

Transfers between store LDR and store N engage, in addition to internal operations control GOI, tape store control GN which provides for controlling the tape driving device, selecting the track addressed, searching for the block within the track and synchronizing the exchange of signals between the two stores which is carried out through the store formed by registers RAO, RA1 and RE1.

Under the control of internal operations control GOI there are transferred to keyboard control GOT, printing-tabulation control GOS, paper services control GSC, etc., the instructions contained in the macroinstruction and relating to the channels controlled by the said controls. These instructions in turn control the flow of data along the channels connecting the keyboard and the printer, respectively, to the computer or actuate mechanical controls appertaining to the paper services.

Keyboard control GOT receives in register TA the characters of the macroinstruction which control the selection of a keyboard of the computer and times by means of control unit CT the transfer of characters through gate *g*4 from the selected keyboard T to printing register RS for direct printing, or through gate *g*5 to register SA for the writing of the characters in that zone of store LDR previously marked with the keyboard operation code.

The paper services control GSC receives in a register SC the characters of the macroinstruction which select a given paper control, prearrange the feed of the paper and operate under the control of control unit CSC the mechanical devices which effect the movement of the various sheets, such as separate forms, continuous forms, etc., in printer S.

The printing-tabulation control GOS is activated in two successive stages of the reading of the macroinstruction.

In horizontal tabulation operations of the printing head of printer S, the tabulation address contained in the macroinstruction is transferred to register RS and is thereafter transmitted, on command of control unit CST, to the mechanical selection devices which control the carrying out and the stopping of the tabulating movement.

For carrying out the printing, register FS of printing control GOS receives those characters of the macroinstruction which are adapted to control the printing and define the methods of printing.

The contents of the register CST specify one of the following methods of printing:

1. Direct numerical printing from store LDR;
2. Numerical printing from store LDR with elimination of the zeros to the left of the first significant digit;
3. Numerical printing from store LDR with replacement of the zeros to the left by asterisks;
4. Printing with control of horizontal format of the line;
5. Printing with control of the horizontal format of the line and with replacement of the zeros to the left by asterisks;
6. Alphabetical and numerical printing from store LDR;
7. Alphabetical and numerical printing from the keyboard.

In the case of printing from store LDR, control GOS controls by means of unit CST, which generates signals CS, the transfer of individual characters from the zone of store LDR headed by the printing operation code to register RS, so as then to transmit these characters one at a time to the printing device of printer S.

In numerical printing, control GOS moreover provides for the elimination of the zeros to the left and for the replacement thereof by asterisks on indication by control unit CST.

In the case of printing with control of the horizontal format of the line, control GOS provides by means of control unit CST for transferring the individual characters of the printing subprogram block to register EDA. Under the control of these characters, there is then effected the transfer to register RS of the characters extracted from the store zone with the leading printing code, or form the same zone ZEO3 which contains the printing subprogram, the characters being then transmitted to the printing device, as will be explained more fully hereinafter.

In the case of printing from the keyboard, control GOS provides for accepting from the keyboard the characters which are to be printed. The characters are staticized in register RS and are thereafter transmitted to printing device of the printer S.

The Normal Macroinstruction

The NORMAL macroinstruction, the format of which is shown in FIG. 3, contains the instructions which control the operation of the basic system formed by the computer, tape store N, printer S and keyboard T. This macroinstruction is formed by 32 places each containing a character with four bits of information.

The following characters correspond to the 32 places of the macroinstruction:

Place 1: label character of the macroinstruction. This character is adapted to differentiate the various macroinstructions, indicating the way in which the successive characters of the macroinstruction are to interpreted.

Places 2—3: characters expressing as a whole one of the 255 horizontal tabulation addresses of the movable printing device.

Place 4: character which selects one or more paper controls of the paper services control from among the following four controls:

1. Right-hand platen control—code symbol RD;
2. Left-hand platen control—code symbol RS;
3. Lower feed control—code symbol TI;
4. Upper feed control—code symbol TS.

Figure 8:
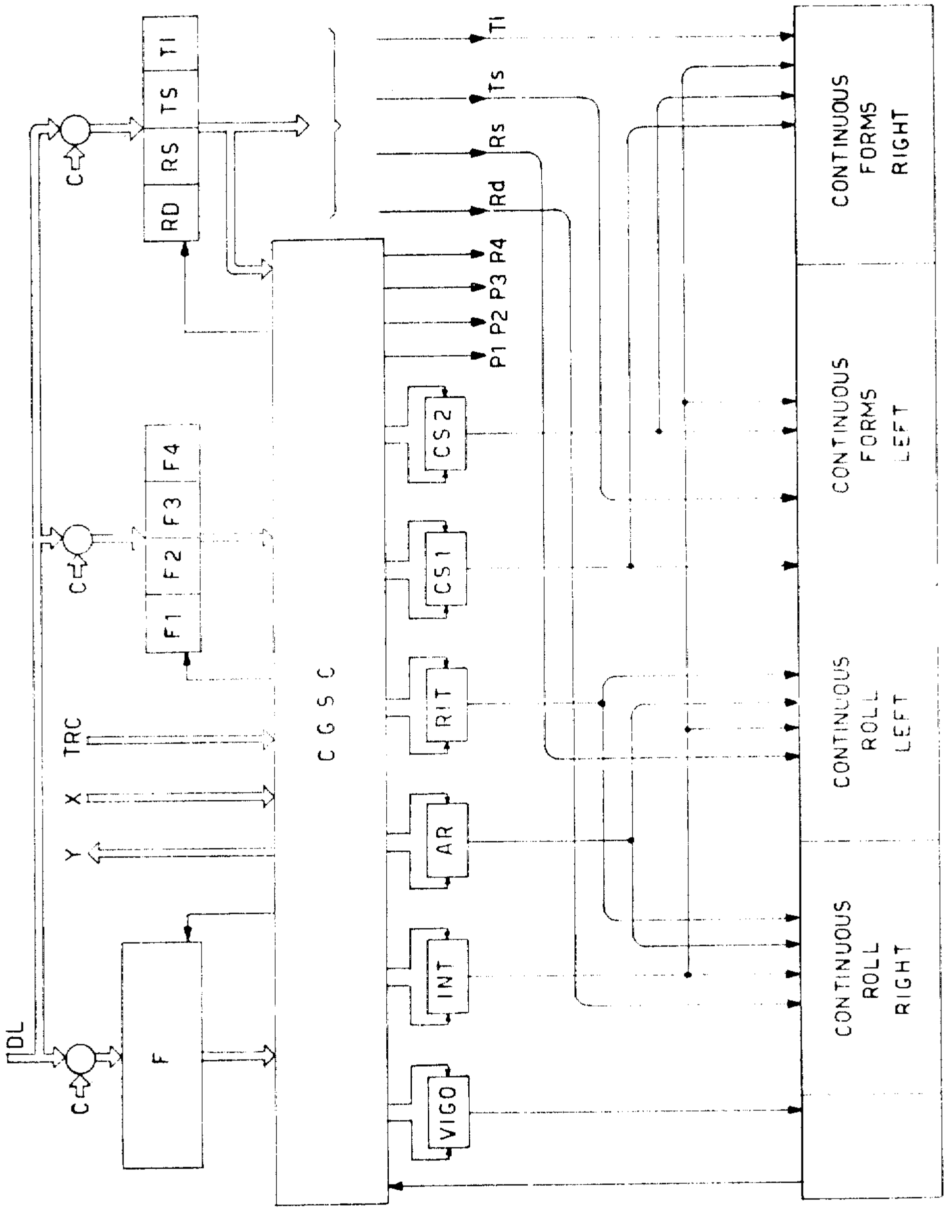
FIG. 8 is a block diagram of a number of elements associated with the control of the horizontal and vertical tabulating means relating to the various documents processed by the printing unit.

Place 5: character which prearranges the jump of the paper by selecting one of the tracks of a loop of the paper jump device which determines the stopping of the jump and by positioning predetermined mechanical jump elements. There are two end-of-paper jump devices associated with the feed means TI and TS, respectively (FIG. 8). Each end-of-jump device may be formed by a loop of plastic sheet material which moves in synchronism with the form to be printed and which contains four selectable tracks having holes spaced from one another according to the length of the jump.

Moreover, there are two mechanical devices associated with feed means TI and TS, respectively, these devices being each controlled by its own electromagnet and being adapted to convert a following line-spacing order into a paper jump with an end, an indication by the respective selected end-of-paper-jump element.

The eight code symbols of place 5 of the macroinstruction therefore assume the following significances:

SCI 1 = Lower feed means, track 1
SCI 2 = Lower feed means, track 2
SCI 3 = Lower feed means, track 3
SCI 4 = Lower feed means, track 4
SCS 1 = Upper feed means, track 1
SCS 2 = Upper feed means, track 2
SCS 3 = Upper feed means, track 3
SCS 4 = Upper feed means, track 4

Place 6: character which controls the following functions in the selected paper control:

1. Opening of the feed rollers and line-spacing. Code symbol AR–INT;
2. Opening of the rollers for introducing accounting cards. Code symbol AR;
3. Prearrangement of the line-spacing and storing of the command "Return to beginning" for effecting line-spacing when this is ordered from the keyboard or from the store LDR. Code symbol TRC–INT;
4. Prearrangement of the line-spacing and of the opening of the rollers and storing of the return-to-beginning command, for effecting return to the beginning with a paper jump when this is ordered from the keyboard or from the store LDR. Code symbol TCR–AR–I.

The significance of these functions will be better explained hereinafter.

Places 7—8—9: function character in place 7 and address of the generic zone Z1 in places 8–9 respectively. The functions which can be coded in place 7 are as follows:

1. ◇—transfer of the zone Z1 to register B of the arithmetical zone ZEO4;
2. *—transfer of the zone z1 to register B of the arithmetical zone ZEO4 and zeroizing of the zone Z1;
3. |◇|—transfer in absolute value of zone Z1 to register B of the zone;
4. /*/—transfer in absolute value of zone Z1 to register B of arithmetical zone ZEO4 and zeroizing of zone Z1;
5. ◇USP—transfer of zone Z1 to register B of arithmetical zone ZEO4 and prearrangement of zone Z1 for printing with the writing of the printing operation code in the leading cell of zone Z1;
6. |◇USP|—transfer in absolute value of zone Z1 to register B of arithmetical zone ZEO4 and prearrangement of zone Z1 for printing with the writing of the printing operation code in the leading cell of zone Z1;
7. USP—prearrangement of zone Z1 for printing with the writing of the printing operation code in the leading cell of zone Z1;
8. Ma—prearrangement for entry from the keyboard in zone Z1 with the writing of the keyboard operation code in the leading cell of zone Z1
9. C—transfer of the constant contained in places 8—9 of the macroinstruction to register B of arithmetical zone ZEO4,
10. *USP—transfer of zone Z1 to register B of zone ZEO4, prearrangement of zone Z1 for printing with the writing of the printing operation code in the leading cell of zone Z1 and erasure of said zone Z1 after execution of the printing,
11. /*USP/—transfer in absolute value of zone Z1 to register B of arithmetical zone ZEO4, prearrangement of zone Z1 for printing by writing the printing operation code in the leading cell of zone Z1 and erasure of said zone Z1 after execution of the printing.

Places 10—11—12: function character in place 10 and address of the generic zone Z2 in places 11—12. The following functions can be coded in cell 10:

1. + —transfer of zone Z2 to register A of arithmetical zone ZEO4, addition A+B of the two arithmetical registers and result to zone Z2.
2. − —transfer of zone Z2 to register A of arithmetical zone ZEO4, subtraction A−B of the two arithmetical registers and result to zone Z2.
3. /+/ —transfer of zone Z2 to register A of arithmetical zone ZEO4, addition of the absolute values /A/+/B/ of the two arithmetical registers and result to zone Z2.
4. /−/ —transfer of zone Z2 to register A of arithmetical zone ZEO4, subtraction of the absolute values of the two arithmetical registers and result to zone Z2.
5. $x$—multiplication of the number located in register B of the arithmetical zone ZEO4 by the number located in zone 2 and result to register A of arithmetical zone ZEO4.
6.♀—transfer of zone Z2 to register A of arithmetical zone ZEO4.
7. USP—prearrangement of zone Z2 for printing with the writing of the printing operation code in the leading cell of zone Z2.
8. M$a$—prearrangement for entry from keyboard in zone Z2 with the writing of the keyboard operation code in the leading cell of zone Z2.
9. CL—prearrangement for the exchange of date between store LD2 and the tape store with the writing of the leading external operations code in the leading cell of the first zone of the long section.

Places 13—14—15: function character in place 13 and address of the generic zone Z3 in places 14-15.

The following functions can be coded in cell 13:

1. + —transfer of zone Z3 to register A of arithmetical zone ZEO4, addition A+B of the two arithmetical registers and result to zone Z3.
2. − —transfer of zone Z3 to register A of arithmetical zone ZEO4, addition of the absolute values /A/+/B/ of the two arithmetical registers and result to zone Z3.
3. /+/ —transfer of zone Z3 to register A of arithmetical zone ZEO4, subtraction A−B of the two arithmetical registers and result to zone Z3.
4. /−/ —transfer of zone Z3 to register A of arithmetical zone ZEO4, subtraction of the absolute values /A/−/B/ of the two arithmetical registers and result to zone Z3.
5.♀—transfer of register A of arithmetical zone ZEO4 to zone Z3.
6. —transfer of zone Z3 to register A of arithmetical zone ZEO4. Division A/B of the numbers contained in the two registers of ZEO4 and result to zone Z3.
7. SS< —investigation of the sign of zone Z3 and storing of the result.
8. USP—prearrangement of zone Z3 for printing with the writing of the printing operation code in the leading cell of zone Z3.
9. M$a$—prearrangement for entry from the keyboard in zone Z3 with the writing of the keyboard operation code in the leading cell of Z3.
10. CL—prearrangement for the exchange of data between store LDR and the tape store with the writing of the leading external operations code in the leading cell of the zone following the last zone of the long section.

Place 16: character which specifies the number of places that the result of an arithmetic operation is to be shifted, either to the right or to the left, in being transferred back to zone Z3. In division operation it provides for the carrying out of the division to a greater number of significant digits.

Place 17: character which prearranges the length of slide zone ZEO5 for controlling the entry capacity of the numerical keyboard. The prearrangement is effected by shifting the beginning-of-zone bit B1 with respect to the end-of-zone bit.

Places 18—19—20: characters adapted to define the functions of transfer between store LDR and the magnetic tape store. The character in place 18 indicates the track containing the block to be operated on the characters in places 19-20 indicate the address of the block within the track. The character located in cell 18 is moreover adapted to indicate one of the following functions:

1. Reading of the tape store on one of the six tracks P1—P6 starting from the block addressed in cells 19-20 and transfer to the zone of the long section of store LDR;
2. Recording on one of the six tracks P1—P6 of the tape store starting from the block address defined by the contents of cells 19-20, where the long section of store LDR is transferred;
3. Reading of the printing subprogram block located in track 7 in the tape store at the block address indicated in cells 19-20 and transfer of this block to zone ZEO3 of store LDR which is used to contain the printing subprogram.

Place 21: printing function character providing selection of the color black or red. Code symbols SH, SR.

Place 22: character for selecting the method of printing:

1. Direct printing of the zone of store LDR with elimination of zeros to the left. Code symbol SZ;
2. Direct printing of the zone of store LDR with replacement of the zeros to the left by asterisks. Code symbol SP;
3. Printing with control of format in accordance with the instructions of the printing subprogram block contained in zone ZEO3 of store LDR. Code symbol E;
4. Printing with control of format in accordance with the instructions of the printing subprogram block and replacement of the zeros to the left by asterisks. Code symbol ESP.

Places 23—24: character for selecting the two keyboard lamps L1 and L2 of the following machine keyboards:

1. Numerical keyboard. Code symbol T$\alpha$;
2. Symbol keyboard. Code symbol LSB;
3. Actuating keys. Code symbol B;
4. Return-to-beginning key. Code symbol TRC;
5. Program keys. Code symbol CPB;
6. Transfer key. Code symbol RB.

Place 25: character for controlling the verification of the following jump conditions:

1. Red-bar actuating key, Code symbol BR;
2. Green-bar actuating key. Code symbol BV;
3. Blue-bar actuating key. Code symbol BB;
4. Program key. Code symbol CP;
5. Transfer key. Code symbol R;
6. Zone Z1=0. Code symbol Z1=;
7. Zone Z1<0. Code symbol Z1<;
8. Overflow to zone Z2. Code symbol Z2 OV;
9. Overflow to zone Z3. Code symbol Z3 OV;
10. Zone Z3=0. Code symbol Z3=;
11. Zone Z3<0. Code symbol Z3<;
12. Condition stored by the instruction of place 26. Code symbol CR.

Place 26: character for storing one of the jump conditions 1— indicated above.

Places 27-28-29-30-31-32: characters which address the macroinstruction block following the current macroinstruction block being executed and cause the transfer thereof to the program zone ZEO1 in store LDR. The two groups of characters located in places 27-28-29 and 30-31-32, respectively, of the macroinstruction are selected in the case of a verified jump condition and in the case of a nonverified jump condition respectively. Each of the two groups of characters controls the reading of a block located on one of the seven tracks P1—P7 of the tape store, the address of the track being defined by the character located in places 27 and 30 and the address of the block by the characters located in places 28—29 and 31—32 of the macroinstruction.

Store Division Macroinstruction

The store division macroinstruction is the first macroinstruction of the program.

Successive divisions of store LDR may take place during the development of the program in order to adapt the capacity of the zones of store LDR or the number of the zones to the various processing phases.

The division macroinstruction is a block of 32 cells which contain the following characters:

Place 1: Division label-character

Place 2: Character indicating whether the division requires erasure of the store.

Places 4—5: Character which defines the address of that zone of store LDR from which the division begins.

Places 6–7, 8–9, 10–11, 12–13, 14–15, 16–17, 18–19, 20–21, 22–23, 24–25, 26–27, 28–29: Each group of two characters starting from place 6 indicates the capacity of a zone expressed as a number of cells belonging to the zone. On the basis of this zone capacity there is carried out a count of character pulses TG adapted to produce the writing of a beginning-of-zone tag bit B1. Each pair of characters therefore defines the place of the beginning-of-zone bit B1 of the zone following that with a capacity equal to the number expressed by the pair of characters. In the case where it is desired to create an alphabetical zone defined by two leading cells each with its own beginning-of-zone bit B1, the pair of characters which indicate the length of this alphabetical zone is preceded by a pair of characters with a code adapted to produce the writing of a tag bit B1 in the cell following the last cell already marked with a beginning-of-zone bit B1 and which therefore becomes the second leading cell of the alphabetical zone.

Cells 30–31–32: Address characters of the following macroinstruction block.

Address of a Zone of the Store LDR or of a Block of the Tape Store N

The addresses of a zone of store LDR and of a block of tape store N are expressed by a number composed of two characters of four bits located respectively in places 8–9, 11–12, 114 15, 19–20, 28–29, 31–32 of the normal macroinstruction. The two characters of the address of the block are preceded by another character located in places 18, 27, 30 of the macroinstruction and which supplies the address of the track in which the block is included.

The address of the zone and of the block is a decimal number constituted (FIG. 3) by a digit of factor $10^1$ comprising the 16 binary configurations of the internal code of the computer and a digit of factor $10^0$ comprising the 10 configurations of the decimal binary code.

This address is therefore adapted to represent 159 numbers corresponding to 159 zones of store LDR numbered in increasing order starting from the first zone ZE01, or corresponding to 159 blocks located within the limits of each track of the magnetic tape.

The character which precedes the two characters of the address of the block is adapted to supply an indication of the function associated with that block, in addition to the address of the track.

More particularly, the character located in place 18 of the macroinstruction can indicate in the internal code of the computer the reading of a block to be transferred to zone ZEO3 of store LDR by selecting track P7 reserved for the macroinstruction and "printing program" blocks; and the reading or writing of a block by selecting one of the remaining six tracks P1—P6 of the tape store N.

The characters located in places 27 and 30 of the macroinstruction are adapted to control the reading only of a block to be transferred to program zone ZEO1 by selecting a generic track from the seven tracks of the tape.

The addressing of the zone and block may be expressed in indirect manner by putting in the places of the macroinstruction intended to receive the zone or block address a special indirect address code NN which, during the phases of interpretation of the instruction, to cause replacement of code NN by the contents of the two least significant cells of indirect address zone ZEO6.

The address of the trace may also be expressed in indirect manner by the use of code N for the tape-store reading instructions located in places 27 or 30 of the macroinstruction.

The writing of an address in the zone ZEO6 of store LDR can be carried out by an entry instruction from the symbol or numerical keyboard or by transfer from another zone of store LDR.

Moreover, code L can be placed in places 27 and 30 of the macroinstruction, this code permitting, at the time of execution of the corresponding tape-store reading instruction and under the control of the control unit GN, the replacement of the code L in register SPO (FIG. 4) of this control unit by the character generated by the striking of a program key of keyboard T.

Addressing of the Store LDR and Execution of a Plurality of Simultaneous Instructions The contents of store LDR, which are formed by bits of information in series, have a nonrecorded interval or store "-gap," between the last bit and the first bit of the items of information.

During each cycle of store LDR, and end-of-store character FM is used to indicate the beginning of the "gap." A bistable element GP (FIG. 2*a*) rendered inoperative by a command C generated by logic network RC in consequence of a condition CI produced by the reading of the end-of-store character and rendered operative by the reading of the first bit leaving amplifier AL after bistable element GP has been rendered inoperative is adapted to synchronize pulses T1—T6 with the successive bits of information read, the pulses T1—T6 being supplied by timing device T which receives the outputs of oscillator 0.

At each cycle of store LDR, fixed-zone counter ZE formed by six bistables connected in shift-register fashion, counts, under the control of logic network CG, the first six pulses TG corresponding to the reading of the beginning-of-zone bits B1 of the first six zones of store LDR and supplies six separate indications ZE01—ZE06 corresponding to these zones.

During each cycle of store LDR, the data-zone indicating register ZO is operative to staticize bits B3—B5 of the leading cell of a data zone and, therefore, to indicate the presence in register LE of a zone headed by an operation code. The logic network CG in turn receives the outputs of register ZO and therefore interprets the bits of information B3—B5 read in register LE in correspondence with the beginning-of-zone bits B1.

Register ZO is formed in three bistable elements Z001, Z002, and Z003 (not shown separately) and is adapted to indicate by energization of bistable element Z001 a zone with an internal operations code; by the energization of bistable element Z002 a zone with a printing operation code; by the simultaneous energization of bistable elements Z001 and Z002 a zone with a keyboard operation code; and by the energization of bistable element Z003 a zone with an external operations code.

The writing of the beginning-of-zone codes in store LDR is effected by internal instructions provided with an address and respectively located in places 7-8-9, 10-11-12, 13-14-15 of the normal macroinstruction.

The interpretation and execution of each instruction of the normal macroinstruction begins in the initial state POO defined by staticizer IP for the states of the computer.

In the state POO, instruction indicator II is enabled to count the 32 places of the macroinstruction in correspondence with the passage through register LE of each of the 32 cells of zone ZEO1.

The instructions of the macroinstruction are read and interpreted under the control of internal operations control GOI which, during the execution of each instruction, positions the tag bit B2 in the cell of zone ZEO1 which contains the function character of the following instruction.

With the reading of tag bit B2 in zone ZEO1, instruction indicator II and label register E generate by means of logic network DF a first signal adapted to define whether the execution of such instruction is to be controlled by internal operations control GOI or by another control.

More particularly, in the case of internal instructions, during the state POO control GOI generates by means of logic network RC and on the basis of the state of label register E and of instruction indicator II, examined in correspondence with the reading of tag bit B2, commands C1...Cn adapted to stop the count in indicator II, transfer the character with tag bit B2 to internal instructions register RFI, shift tag bit B2 in the following two address cells of the instruction to permit transfer of the contents of these cells to registers RA0–RA1, and position tag bit B2 in the cell of zone ZEO1 which contains the first character of the instruction following that being examined at the moment.

With the transfer of the function character of the instruction to register RFI, there is energized a fresh output of logic network DF which is adapted to define dually the function corresponding to the current instruction. If, for example, the instruction is an internal instruction of the internal-transfer- and prearrangement-for-printing type (◇USP), internal operations control GOI remains engaged for the execution of this instruction. More particularly, under the control of logic network CG, there is defined the new state PO1 of the computer, in which logic network RC generates fresh commands which cause registers RAO and RAI to be connected as a counter and insert an initial count therein. A count of one is performed in correspondence with each beginning-of-zone bit B1. The overflow of counter RA0–RA1 coincides with the presence in register LE of the beginning-of-zone cell corresponding to the address of the instruction.

The overflow of counter RA0–RA1, which is signalled by an internal condition bistable element CI, generates through logic network RC fresh commands C1—Cn adapted to write in store LDR, by means of register SA, the internal operations beginning-of-zone and to position in that zone and in the arithmetical zone ZE04 tag bit B2 in the cells concerned in the transfer of the first character.

Transfers from the zone with an internal operations code to the arithmetic zone ZE04 provide for the reversal of the order of sequence of the digits of the number contained therein, so that the zone with the operation code and the arithmetical zone can respectively contain a number already in readiness for the execution of the respective operations of printed and computation.

The arithmetical zone ZE04 comprises two registers A and B interlaced or interlinked in such manner that successive cells of the zone contain characters belonging alternately to one and the other of registers A and B.

The transfer of the contents of a zone with an internal operations code register A or B of arithmetic zone ZE04 is defined by the function code of the same transfer instruction. (◇USP).

This transfer instruction is executed in state PO3 of the computer, which replaces state PO1,whereby there is terminated the operation of heading with the internal operations code of the zone addressed by the instruction.

In state PO3,logic network RC generates commands C1—Cnadapted to effect the internal transfer in conformity with the principles set forth above by carrying out at each cycle of store LDR the transfer of a character from the internal operations zone to register RAO and from this register to register A or B of the arithmetic zone ZEO4, the two zones being respectively identified by zone indicating register ZO and by zone counter ZE and the individual cells of the respective zones by the respective tag bits B2. Under the control of the internal operations control G0I, tag bits B2 shift at each cycle of store LDR through the successive cells of the two zones, starting, in the zone headed by the internal operations code, from the last cell of the zone which contains the least significant digit and, in arithmetical zone ZE04, from the first cell of the zone which receives the least significant digit of the number to be transferred.

The end of the transfer, defined by the reading of the beginning-of-zone bit B1 of the zone headed by the internal operations code, causes the change of the computer from state PO3to state P04,during which the internal operations control GOI commands the erasure of the internal operations code and the two B2 bits and the writing of the printing operation code in the leading cell of the zone addressed.

The zone defined by the address of the internal instruction therefore is headed by the printing operation code and is thus ready to be used by a printing instruction of the same macroinstruction or of following macroinstructions.

With the end of each instruction which engages the internal operations control GOI in the execution phase, the instruction indicator II is zeroized, so as then to resume, with the first reading of zone ZEO1, the count of the successive 32 cells of this zone and stop in correspondence with the cell marked with tag bit B2, which contains the first character of the following instruction of that macroinstruction.

In similar manner, the internal instructions located in places 7-8-9, 10-11-12, 13-14-15 of the normal macroinstruction are adapted to head zones with a keyboard operation or external operations code, the utilization of which will be established by the respective instructions for entry from the keyboard or for transfer from or to the tape store, of that macroinstruction of a following macroinstruction.

From the description of the instruction of internal transfer with prearrangement for printing of the zone addressed by the same instruction, it is apparent that the operation code of a data zone of store LDR is used to identify that zone during successive cycles of the store, replacing a beginning-of-zone bit B1 counter, and that moreover the code is adapted to designate the respective zone for a predetermined internal-transfer or external-transfer operation.

The operation code with which an internal instruction provided with an address heads a generic data zone of store LDR under the control of the internal operations control GOI is adapted to command the control GOI to carry out immediately the transfer relating to that zone or simply to designate the same zone for operations which will be performed subsequently under the control of the internal operations control GOI or of other controls of the computer.

The tabulation and paper services instructions which are located in cells 2,3 and 4,5,6, respectively, of store LDR engage store LDR and the internal operations control GOI only for the time of reading of the characters of the instruction. These characters are transferred to the printing-tabulation control GOS and the paper services control GSC, respectively, which provide for the performance of the relative commands and for creating internal conditions adapted to signal the engagement of the peripheral units on the channel Y to the internal operations control GOI.

The internal instructions (arithmetical instructions, transfer instructions, instructions for heading of zone with operative printing, keyboard and external operations codes) located in cells 7-8-9, 10-11-12, 13-14-15 of zone ZEO1 are executed in a number of cycles depending on the length of the operand addressed under the control of the internal operations control GOI.

The reading of the program zone is stopped for the whole of the time required for the execution of the instruction.

The instructions for transfer to and from the tape store which are located in cells 18-19-20, 30-31-32 of zone ZEO1 of store LDR are executed in a number of cycles of store LDR depending on the length of the transfer.

During the execution of these instructions, the reading of the program zone is stopped because the instructions simultaneously engage the internal operations control GOI and the tape-store control GN, which respectively provide for the transfer of groups of characters of store LDR to the buffer formed by registers RAO, RA1, REO, and REI and for the transfer of the characters from the buffer to magnetic tape store N.

In the case of recording in the magnetic tape store, the zone of store LDR which is concerned in the transfer is always the long-section zone, while in the case of reading of the magnetic tape store the zones of store LDR which are concerned in the transfer may be the long-section zone, the program zone ZEO1 and the printing subprogram zone ZEO3.

The printing-from-store instruction located in cells 21 and 22 of zone ZEO1 of store LDR engages the printing control GOS and the zone of store LDR with the printing code in the cell at the beginning thereof.

The printing-from-keyboard instruction located in cells 21 and 23 of zone ZEO1 of store LDR engages keyboard control GOS and the keyboard selected.

The instructions for entry of information from the numerical and alphabetical or symbol keyboard, which instructions are located in cells 23 and 24 of zone ZEO1 of store LDR engage keyboard control GOT and zone ZEO5 and the zone with the keyboard operation code in the cell at the beginning thereof, respectively, of store LDR.

In the instructions which concern printing control GOS, keyboard control GOT and the paper services control GSC there is effected the transfer of the characters designating the respective instructions to the respective controls, which provide for controlling the execution of the instruction and for signalling the engagement of the corresponding peripheral unit to the internal operations control on the respective channels.

The reading of the program zone ZEO1 is not stopped during the execution of these instructions.

The stopping of the reading of the instructions of program zone ZEO1 is effected under the control of internal operations control GOI during the execution of internal instructions and instructions for transfer to and from the tape store, and also in consequence of printing, keyboard or paper services instructions, etc., or if the printing-tabulation control GOS, the keyboard control GOT or the paper services control GSC is already engaged in the execution of a preceding instruction temporarily incompatible with the current instruction.

The existence of controls separate from the internal operations control GOI and each adapted to control transfers on a predetermined peripheral channel, and of operation codes adapted to designate a generic data zone of store LDR for the transfer on a predetermined channel, limits the engagement of internal operations control GOI, in predetermined operations of transfer on peripheral channels, solely to the reading of the corresponding transfer instruction, which is then executed under the control of the respective peripheral controls.

Therefore it is possible, during each cycle of store LDR, to overlap the reading and execution of an internal instruction or an instruction for transfer from and to the tape store with the execution of printing, entry-from-keyboard or paper services instructions or instructions relating to another external channel, even if the instructions are simultaneous, provided that the instructions do not engage the same mechanical means.

Exchange of Information Between the Store LDR and the Magnetic Tape Store

Transfers of a long section of store LDR to magnetic tape store N and the transfer of a block of the magnetic tape store to the long section of store LDR are programmed by instructions located in places 10–11–12, 13–14–15, 18–19–20 of the normal macroinstruction.

Transfers from tape store N of the macroinstruction and printing subprogram blocks to fixed zones ZEO1 and ZEO3 respectively of store LDR are programmed by instructions located in places 27–28–29 or 30–31–32 and 18–19–20, respectively, of the normal macroinstruction.

The execution of the instructions contained in cells 10–11–12 and 13–14–15, respectively, of the program zone of store LDR defines the long section, that is that part of the store which is delimited by two cells, a beginning-of-zone cell and an end-of-zone cell, with an external operation code. The contents of the long section will thereafter be transferred to the magnetic tape or the long section will receive a tape block in consequence of the instruction located in cells 18–19–20.

The long section may contain a plurality of zones defined by beginning-of-zone bits B1, provided that they have the corresponding leading cells free from external operations, printing or keyboard operation codes.

With the reading of cell 18 of the program zone ZEO1 there is indicated the track to be selected and the function to be performed (recording or reading), while the address of the block is given by the characters located in cells 19 and 20.

The recording of a block in the tape store, which is commanded by the instruction located in cells 18–19–20, can be carried out only on tracks P1—P6 of the tape and always requires the definition of a long section in store LDR.

The reading of a block of the tape store, programmed in cells 18–19–20, can transfer the block addressed from the tracks P1—P6 of the tape to the long section or transfer a block of a fixed length of 32 characters and which has the function of a printing subprogram from track P7 of the tape to fixed zone ZEO3 of store LDR.

The reading of a block of the tape store, programmed in cells 27–28–29 (30–31–32), effects the transfer of the macroinstruction from a generic track P1—P7 of the tape to program zone ZEO1 of store LDR.

In transfer of the macroinstruction and the printing subprogram block to store LDR, the reading process is substantially like the process of reading a block intended for the long section and differs only in the addressing of store LDR.

Recording on Tape

The instruction for recording the long section held in store LDR begins its execution phase after the reading of cells 18–19–20 of program zone ZEO1, during which the character located in cell 18 is transferred to internal instructions register RFI and the characters located in cells 19–20 are transferred to registers RA0 and RA1, respectively.

The instruction indicating register II is stationary at place 18, corresponding, in the normal macroinstruction, to the function of the tape instruction.

If registers RA0 and RA1 contain the indirect address code NN, instead of a block address, the address contained in the second and third cells of address zone ZEO6 is transferred to the registers.

The registers RA0 and RA1 formed by the group of four bistable elements RA01, RAO2, RAO4, RAO8, and RA11, RA12, RA14, RA18, respectively form part of buffer RA (FIG. 4) which can be extended from two to six registers in relation to the length of the delay line of store LDR. The number of registers is determined by the ratio between the time required for one cycle of store LDR and the frequency of reading from or recording on tape.

Figure 4:
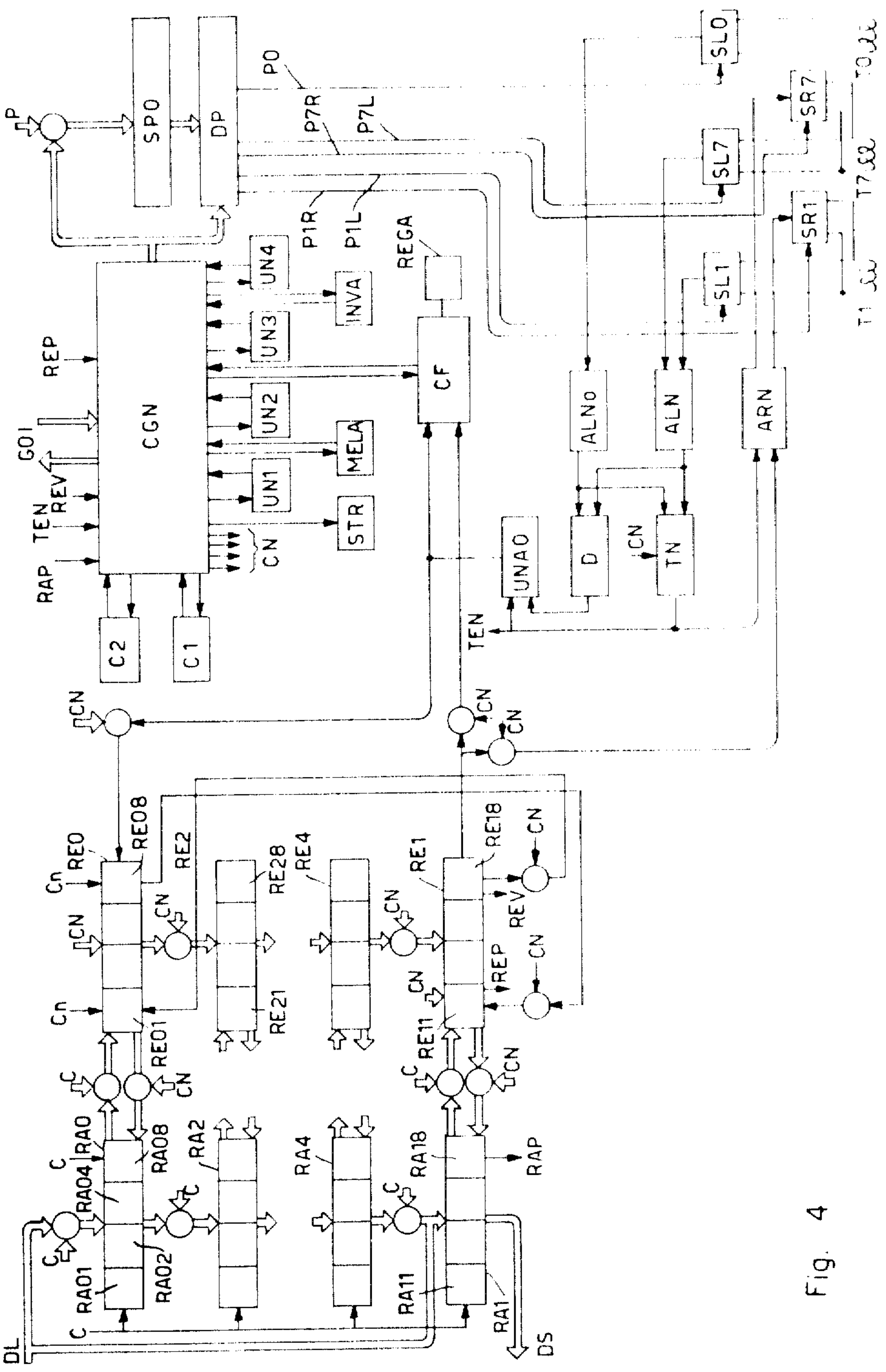
FIG. 4 is a block diagram of a number of elements associated with the control of the tape store.

Irrespective of the number of registers of which buffer RA is composed, registers RA0 and RA1 are always the first and last registers of the buffer, and between these registers are located registers RA2, RA3, RA4 and RA5, as indicated in FIG. 4.

In the tape operations there is moreover used a second buffer RE formed by the same number of registers, each having four bistable elements, as make up buffer RA and of which registers REO and RE1 are the first and last registers respectively.

The transfer of the characters from and to the tape is preceded by a search for the address of the block.

In state PO1, defined by the internal operations control GOI during the instruction of recording on tape, the contents of buffer RA are transferred to buffer RE, buffer RA is zeroized and tag bit *Ba* is written in bistable RA08 of the buffer RA (FIG. 4).

In state PO3, which follows state PO1, there begins the transfer of the characters of the long section to buffer RA until buffer RA is completely filled. This transfer is carried out character by character from output register LE to register RAO of the buffer RA, and at the same time the contents of each register shifts at each character pulse TC to the lower register until register RA1 is filled.

The tag bit *Ba* entered in bistable element RAO8 is adapted to signal that buffer RA is full when bit *Ba* is extracted from bistable element RA18 of register RA1.

The filling of buffer RA interrupts the reading of the long section, while the advance of tag bit B2 inside the long section is arrested at that store cell from which the following transfer from the long section to buffer RA will begin.

The state PO3 is followed by state PO4, which controlling logic network CGN of control GN of tape store N, connected through channels X and Y to logic network CG of control GOI, selects reading amplifier ALN*0* of track TO.

This selection is carried out by rendering operative output PO of logic network DP fed by the outputs of register SPO staticizing the track address character, which is initially zeroized.

The same logic network CGN renders operative start bistable element STR, which starts the tape motor, and univibrator UN1, which covers the starting time.

The tape is recorded by the frequency duplication system which supplies for each track the clock signals and the corresponding indications "one" and "zero" of the corresponding binary information.

The timing device TN (FIG. 4), which generates the pulses TEN in correspondence with each tape clock signal, is adapted to supply in cooperation with discriminating unit D fed by amplifier ALN*o*, the information "one" or "zero" corresponding to each clock signal. This binary information is stored in bistable element UNAO at each pulse TEN.

The reading necessary for searching for the address of the block must be made possible in the gap preceding the eight bits of the address of the block. To this end, a variable-time store MELA is rendered operative initially together with univibrator UNI and thereafter at each pulse TEN for a time of prefixed duration. The deactivation of store MELA therefore signals the presence of a gap below the reading head.

The deactivation of store MELA commands the change from state PO4 to state PO5 in the internal operations control GOI through the medium of logic network CGN of control GN.

In state PO5, pulse TEN which are generated at each clock signal after the gap permit, by means of logic network CGN, a comparison between bistable element UNAO and bistable element RE18 of buffer RE, which is carried out in comparator CF, and, by means of commands CN generated by logic network CGN, cause the contents of registers REO and RE1 which are closed in a ring, to shift so as to permit the comparison to be effected at all eight bits of the address. The result of the comparison bit by bit is stored in bistable element REGA.

At the same time, counter C1 counts pulses TEN and, with the eight count, renders operative univibrator UN2 which, on becoming inoperative, investigates the state of counter C1 and is adapted to signal through the medium of bistable element INVA the absence of pulses TEN following that which causes counter C1 to assume the configuration eight.

If signal INVA is present, this makes possible the examination of the result of the comparison staticized in bistable element REGA, which is adapted to signal the possible end of the search for the address.

This signal, sent by unit CGN of control GN to control GOI, causes the change to the new state PO6, during which register RFI of control GOI is transferred through channel P to register SPO of tape control GN and univibrator UN3 is rendered operative. The contents of register SPO cause the selection for recording of the corresponding track of the tape by means of logic network DP, which energizes the output corresponding to selection unit SR connecting the head of that track to recording amplifier ARN. The selection for recording gives rise to the erasure of the magnetic tape, which continues until univibrator UN3 is rendered inoperative.

When univibrator UN3 is rendered inoperative, the contents of buffer RA are transferred to buffer RE and a command CN renders operative timing device TN, which is adapted to generate spontaneously pulses TEN which time the writing. This is carried out by successive transfers of groups of characters from buffer RE to the tape, from buffer RA to buffer RE, and from store LDR to buffer RA.

The filling of the buffer RA from store LDR and the transfer from buffer RA to buffer RE are carried out as described in the case of state PO3.

The bits recorded on tape are extracted in correspondence with the information pulses TEN from bistable element RE18 of buffer RE. Each information signal TEN moreover commands counter C2, which counts the bits of each character which are transmitted to the tape and causes the shifting of the contents of the bistable elements of register RE1 to the right so as to present the successive bits of the character contained in register RE1 in bistable element RE18.

After the fourth count, counter C2 is zeroized and logic network CGN commands the vertical shifting of the registers of buffer RE toward lower register RE1 and the writing of a tag bit *Be* in bistable element REO8 of register REO. The successive transfer of characters from register RE1 to the tape is accompanied, at each zeroizing of counter C2, by a vertical shifting carried out in the registers of buffer RE until tag bit *Be* recorded in bistable element REO8 reaches the bistable elements RE18 of the last register and signals the emptying of buffer RE to logic network CGN. This signal produces a fresh transfer from buffer RA to buffer RE.

The transfers from store LDR to buffer RA terminate with the reading of the external operation code located in the cell delimiting the long section.

The last filling of buffer RA will generally not be such as to fill it completely and the indication that buffer RA is full will be replaced by that indicating the end of the long section. In this case, the last transfer from buffer RA to buffer RE will be followed by a series of vertical shifts in the registers of buffer RE carried out by pulses TG, until the tag bit *Ba* recorded initially in bistable element RA08 of register RAO and then transferred to buffer RE issues from bistable element RE18 of register RE1.

The first of these vertical shifts is moreover accompanied by the writing of a tag bit *Be* in bistable element REO8 of register REO, which is therefore in a position adapted to signal, in the following phase of transfer from buffer RE to the tape, the reading of the last bit of the last character of the block by the passage of said tag bit *Be* to bistable element RE18.

Reading of Tape

In the reading of a tape block, the transfer of the characters of the block to store LDR is preceded by an address search similar to that considered in connection with recording on tape.

The initial state PO1, during which register RFI and registers RAO and RA1 of buffer RA are filled and the transfer of contents of buffer RA to buffer RE is carried out, is not followed by the state PO3 in which characters are transferred from the long-section zone to buffer RA, but directly by states PO4 and PO5 for searching for the address of the block.

In the subsequent state PO6, the transfer of the contents of register RF1 to register SPO of the tape control is effected, the corresponding track is selected for reading and univibrator UN4, which covers selection disturbances, is rendered operative. This selection is carried out through the medium of logic network DP, which energizes the output corresponding to selection unit SL of that track, which selection unit is adapted to connect the head to reading amplifier ALN.

On the univibrator UN4 being rendered inoperative, the reading of the block begins.

The individual bits are transferred at each pulse TEN to bistable element REO8 of the register REO, while at the same time the shifting of the contents of each bistable element of register REO to the adjacent bistable element on the left and the count add one in the counter C2 are effected.

At every four counts of counter C2, each register of buffer RE shifts vertically toward the lower register. The complete filling of buffer RE is signalled by a tag bit B*e* which, recorded initially in bistable element REO1, is transferred to bistable element RE11 in correspondence with the vertical shift commanded by counter C2.

The filling of buffer RE produces in the control GOI the new state PO7 of the computer, during which the contents of buffer RE are transferred to buffer RA.

The contents of buffer RA are transferred in turn to the long-section zone of store LDR, while buffer RE is again ready to receive the fresh characters read on the tape.

The writing of each character in store LDR takes place by transferring, at each pulse, TG, the character contained in register RA1 to register SA for writing in the store, after the zone of store LDR and the cell from which the transfer is to commence have been identified by the zone indicating means and the tag bit B2, respectively.

Each passage of a character from register RA1 to register SA is accompanied by a vertical shift of each register of buffer RA toward the lower register.

A tag bit B*a* recorded in bistable element RAO8 of register RAO simultaneously with the first vertical shift performed in buffer RA is adapted to indicate the emptying of buffer RA when this tag bit B*a* is extracted from bistable element RA18 of register RA1.

If the last group of characters read on the tape does not fill buffer RE, filling is completed by simulating the pulses TEN and writing a tag bit B*e* in bistable element REO8 simultaneously with the first pulse TEN that is simulated.

In this way, in the following transfer from buffer RE to buffer RA, the latter comes to contain the tag bit B*a* already positioned in such manner as to effect the transfer only of the significant characters from register RA1 to register SA.

The Keyboard Group

The keyboard group of the computer embodying the invention comprises a command keyboard, a numerical keyboard, an alphanumerical keyboard and a symbol keyboard.

The use of the keyboards is controlled by selection instructions located in plates 23 and 24 of the macroinstruction, which releases the keyboards and make them usable.

In place 23 there may be coded the functions T*a*, T*n*, LBS, which release the alphanumerical, the numerical and the symbol keyboards, respectively, the functions L1T*n*, L1T*a*, L2T*n*, L2T*a* which combine with the selection of the numerical or alphanumerical keyboard and the lighting of the keyboard lamps L1 and L2, respectively, and the functions L1 and L2, which produce the lighting of the respective lamps L1, L2. In place 24 there may be coded the functions B, TRC, CPB, RB, which release the actuating keys (driving bars), the key for return to the beginning, the program keys and the transfer key, respectively.

Alphabetical and Numerical Keyboard

The alphanumerical keyboard T*d* (FIG. 5) comprises:

1. 46 alphanumerical keys;
2. Two shift keys;
3. One shift lock key;
4. One space key;
5. One backspace key;
6. One release key.

A slide is associated with each of the aforesaid keys, with the exception of the release key, the two shift keys and the shift lock key. Each slide controls seven code bars for generating a configuration of bits on seven code microswitches, further controls the seven code bars by means of an eighth bar and moreover commands by means of a ninth bar the closing of a microswitch arranged to transmit to the keyboard control GOT a signal ST2 indicating the availability on the code microswitches of the character struck.

Entry from the alphanumerical keyboard must be accompanied by printing of the characters struck, for which reason the release of the alphanumerical keyboard, which release is commanded by the corresponding selection instruction, is conditioned on the entry of the printing instruction in plate 21 of the normal macroinstruction.

Numerical Keyboard

The numerical keyboard TN comprises:

1. Nine keys for the digits one to nine;
2. One key for the zero;
3. One key for the double zero;
4. One key for the treble zero.

The use of the numerical keyboard is always made possible by the corresponding selection instruction and is adapted to generate by means of the code bars and microswitches the corresponding digit coded in four bits of binary coded decimal to be transmitted to zone ZE05 of store LDR, which zone is assigned to receive the outputs of the numerical keyboard.

Symbol Keyboard

The symbol keyboard T3 is rendered operative by its own selection instruction in places 23 and 24 of the macroinstruction and is formed by 16 keys, each of which generates by means of the code bars and microswitches a character of eight bits in the internal binary code which is adapted to identify a prefixed address of a zone of store LDR or of a block on the magnetic tape. This character is transmitted to the store zone with the keyboard operation code in the leading cell.

Command Keyboard

The command keyboard TC comprises:

1. Three program keys;
2. Four actuating keys (driving bars);
3. One transfer key;
4. One Transfer cancelling key;
5. One key for return of the printing head to the beginning.

The program keys CP are selected by the corresponding instruction, which releases the program keys and at the same time the actuating keys. The striking of each of the program keys, followed by that of an actuating key, acts on microswitches adapted to generate a character in 4-bit binary code, which is transmitted to the computer. The character corresponding to each of the three program keys can be used as a track address in the instruction for reading the magnetic tape store, the address being located in places 27–28–29 or 30–31–32, respectively, of the macroinstruction.

The transfer key R, which is released together with the actuating keys B by the corresponding selection instruction, is used to generate an external jump condition which is stored in a microswitch of the keyboard.

The actuating keys B, which are released by the appropriate selection instruction, can be used to confirm the depression of the program keys and the transfer key, to create external jump conditions by arranging predetermined microswitches of the keyboard, or to signal to internal operations control GOI the end of an entry from the numerical, alphanumerical or symbol keyboard.

The key TRC for return to the beginning, which commands the return of the printing head to the last horizontal tabulation position, is released by the appropriate selection instruction. It acts on the code bars of the alphanumerical keyboard to generate on the corresponding microswitches a character "T*rc*"a to be transmitted to store LDR and at the same time to paper services control GSC. The character "T*rc*" can therefore be used by the paper services control GSC, at the moment of the striking of key TRC or on the following reading of character "T*rc*" in store LDR, in relation to what is prearranged by the instructions controlling the paper services.

The transfer cancelling key acts on the transfer microswitch, repositioning it in the inoperative state.

The Entry-From-Keyboard Instruction

Figure 5:
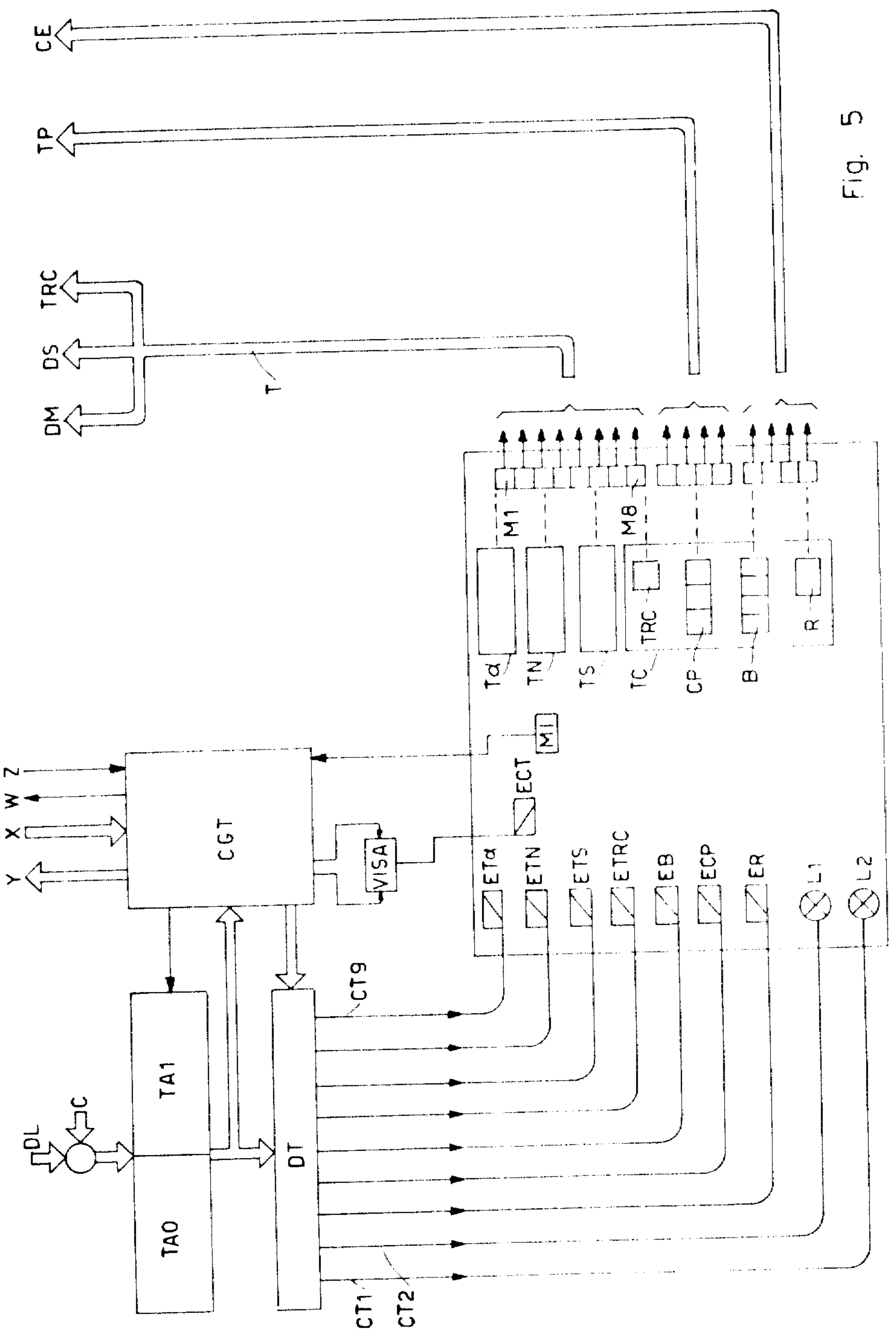
FIG. 5 is a block diagram of number of elements associated with the keyboard of the computer.

The characters for selecting the keyboards, which are located in cells 23 and 24 of zone ZE01 of store LDR, are read and transferred to registers TA0 and TA1, respectively, of keyboard control GOT (FIG. 5).

The controlling logic network CGT, which is connected to the internal operations control GOI through channels X and Y and to the printing and tabulation control GOS through channels Z and W, signals the engagement of keyboard control GOT to control GOI and receives from control GOS an indication of availability of printer S for making alphabetical and numerical entries.

The logic network DT which receives the outputs of registers TA0 and TA1 and operates under the control of network CGT supplies at nine separate outputs seven commands CT3—CT9 adapted to energize electromagnets ET, ET*n*, ETS, ECP, EB, ER and ETRC, which respectively select the alphabetical, numerical, symbol, program and actuating keys, the transfer key and the key for return to the beginning, and two commands CT1, CT2 which produce the lighting of the two keyboard lamps L1 and L2.

At the same time, a bistable element VISA is rendered operative and, through electromagnet ECT, commands a first mechanical cycle adapted to effect the release of the keyboards selected.

The striking of a code key generates a striking cycle during which the character is coded and made available in the keyboard microswitches M1......M8. The availability of the character is signalled by microswitch MI, which transmits the signal ST2 to keyboard control GOT. The character available in the microswitches of the keyboard is used differently according to the type of entry selected.

In entry from the symbol or numerical keyboard, the writing in the store of the character struck is carried out during the cycle of store LDR following the generation of signal ST2. The character is transferred on the channels DM, DS from the microswitches M1......M8 and M1......M4, respectively, of the keyboard to register S*a* and is written in the store in correspondence with the successive cells of the zone headed with the keyboard operation code and in correspondence with the successive cells of slide zone ZE05, respectively.

Entry from the alphanumerical keyboard is always associated with the printing of the characters struck on the keyboard and therefore requires the presetting of the printing and tabulation control GOS for printing. The character struck is transferred on channel DS from microswitches M1....M8 to printing register RS of control GOS with signal ST1 generated at each printing cycle and following signal ST2 corresponding to the character struck on the alphanumerical keyboard.

The transfer can therefore be effected only if the printing and tabulation control GOS is not already occupied in a preceding printing or horizontal tabulation operation. The character transferred in this way to register RS is transmitted for printing and at the same time to the zone of store LDR with the keyboard operation code in the leading cell. The end of the entry from the numerical, alphanumerical or symbol keyboard is signalled by the striking of an actuating key which, by means of control GOT, transmits to internal operations control GOI a signal adapted to command the erasure of the keyboard operation code, thereby rendering the said zone free for other purposes.

The striking of an actuating key which sets a jump condition or of the transfer key followed by the striking of an actuating key, causes the closing of respective keyboard microswitches which are read through channel CE by following instructions for comparison with the jump conditions stored in places 25 and 26 of the normal macroinstruction.

With the striking of a program key followed by the striking of an actuating key, the character adapted to indicate the address of a track of the magnetic tape is made available on the microswitches corresponding to said key. This character is transferred through the channel TP to register SPO (FIG. 4) of tape store control GN by the reading instruction located in cells 27–28–29, 30–31–32 of program zone ZE01, if the instruction contains the code L in place of the track address.

Printing and Horizontal Tabulation

The printer connected to the computer is provided with moving and stop means for tabulation and with a movable printing unit which slides along a horizontal axis parallel to the platen.

The printing unit comprises:

1. the printing head with type wheels;
2. the typewriter ribbon holder;
3. the character decoding and positioning assembly.

The printing head is interchangeable and contains four or six printing wheels each with 16 types or characters, which permit the printing of 64 and 96 characters, respectively, of various kinds, namely alphabetical and capital characters, numerical characters and special symbols.

The writing is serial and takes place from left to right; it is of the impact type with stopping for striking on the platen.

The decoding and positioning roller is the assembly of mechanical devices required for interpreting the codes transmitted by the printing control and for the consequent vertical and horizontal positioning of the writing wheels for the printing of each character.

The printing of each character is carried out during a mechanical printing cycle, defined by the rotation of a main shaft, which supplies the power necessary for the execution of the commands which effect the mechanical selection of the character, the striking action and the horizontal advance of the movable printing unit.

Figure 6:
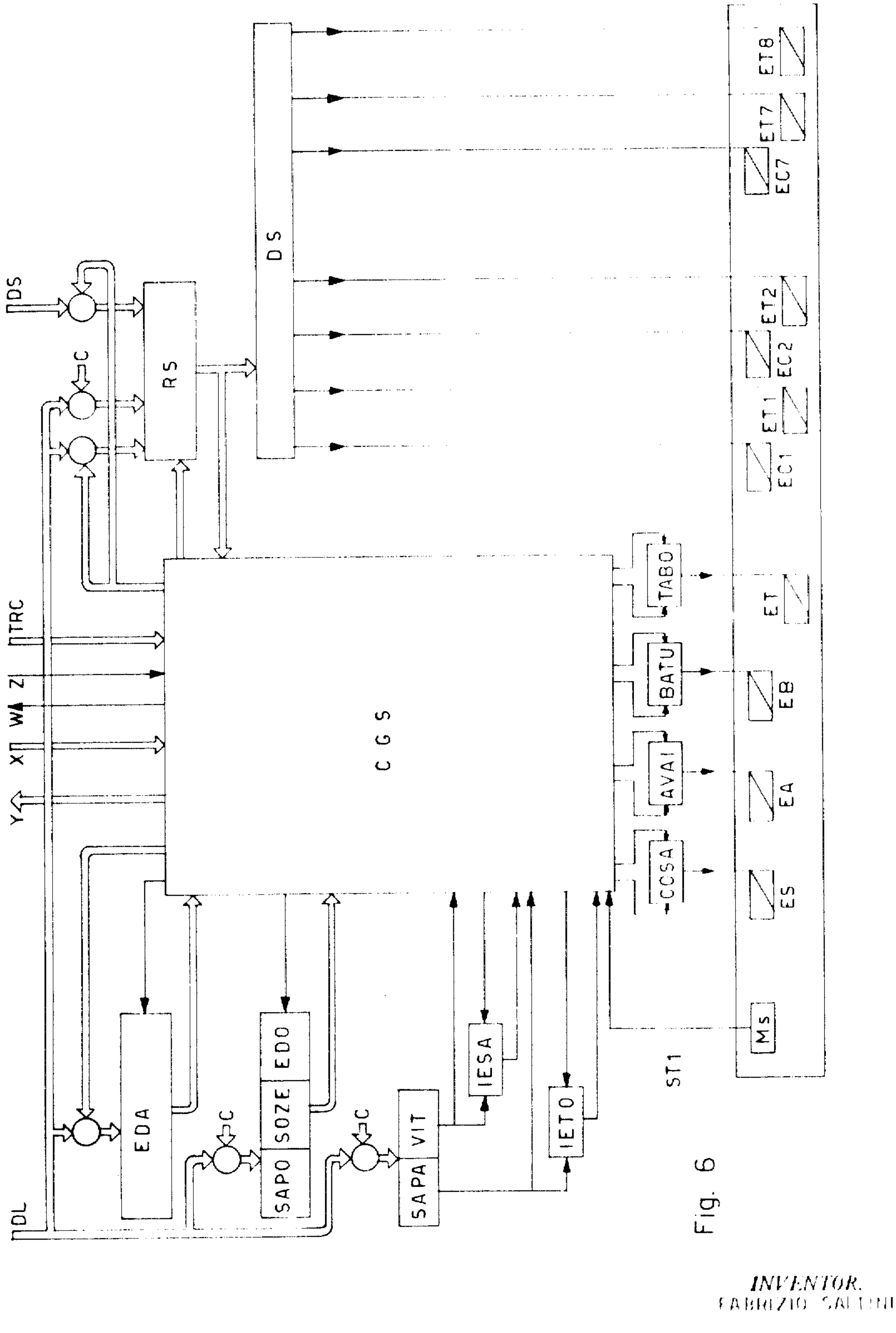
FIG. 6 is a block diagram of a number of elements associated with the control of the printing.

To each command there correspond one or more electromagnets which prearrange the execution of the command itself. The energization of the electromagnets is commanded in turn by signals supplied by the printing and tabulation control GOS (FIG. 6).

The printing commands act sequentially during the 360° of the cycle, energizing the corresponding electromagnets, investigating mechanically the state of the electromagnets which position mechanical store members and thereafter carrying out the required function in dependence on the state of the store members.

Figure 7:
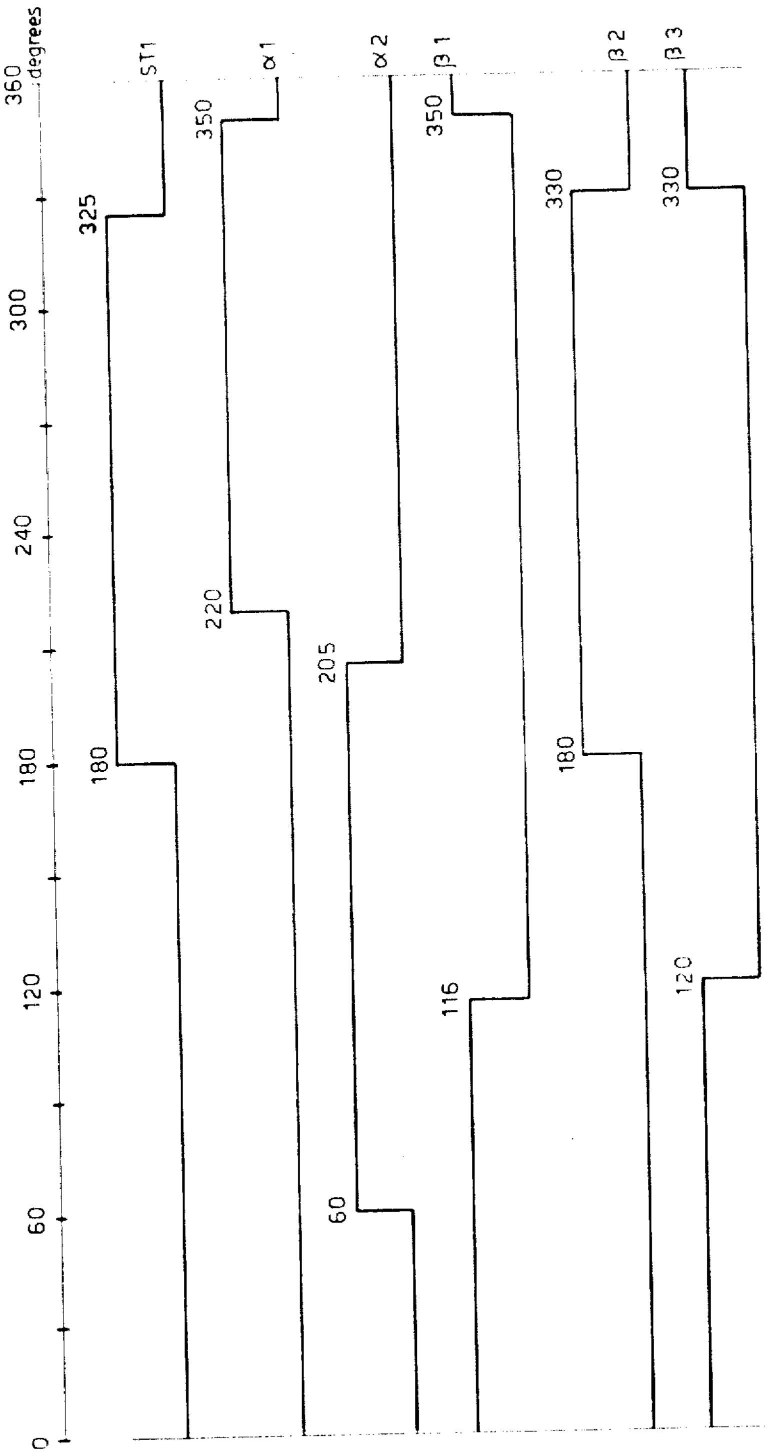
FIG. 7 shows the course in time of a number of signals present in the computer.

More particularly, with reference to FIG. 7, the transfer of a character from the zone of store LDR with the printing operation code to register RS of control GOS and the consequent energization of code electromagnets EC1.....EC7 are commanded by signal ST1 supplied by the microswitch M*s* controlled by the rotation of the main shaft. The signal ST1, generated about halfway through the printing cycle, is followed by the phase of mechanical reading $\alpha 1$ of the code electromagnets and the character selection phase $\alpha 2$, which take up the first and second halves, respectively, of the cycle.

The trailing edge of signal ST1 renders operative bistable elements BATU and AVA1 of control GOS, which energize the respective electromagnets EB for the striking of the type and EA for the step-by-step advance of the movable printing unit.

The phase of mechanical reading B1 of the electromagnets and the phase of setting B2 of the corresponding mechanical members begin with a delay of about 120° with respect to the phases 1 and 2 which characterize the similar functions relative to the code electromagnets (FIG. 7). The phase B2 is followed by the phase B3 of carrying out of the striking and of horizontal advance of the movable printing unit.

In this way, during a generic printing cycle, the striking of the $n$th character, the mechanical selection of the $(n+1)$th character and the energization of the code electromagnets of the $(n+2)$th character are preformed.

Printing may take place both from the keyboard and from store LDR. More particularly, there are possible alphanumerical printing from the keyboard and the store, numerical printing direct from the store or numerical printing from the store controlled by the printing subprogram in zone ZE03 of store LDR.

The printing is programmed by putting in cells 21 and 22 of the normal macroinstruction characters adapted to command the printing and define the desired methods of printing.

Alphanumerical keyboard printing is always performed during the entry of characters from the alphanumerical keyboard in store LDR, for which reason the use of the alphanumerical keyboard is conditioned by the availability of control GOS.

In alphanumerical keyboard printing, places 21 and 23 of the macroinstruction are used by putting the printing function code in place 21 and the character adapted to select the alphanumerical keyboard in place 23.

Each character struck on the alphanumerical keyboard can be transmitted, simultaneously with the printing, to an alphabetical zone of store LDR with the keyboard operation code in the leading cell of the zone.

The printing instruction begins with reading of cell 21 of the program zone ZE01 of store LDR. The reading of this cell produces the transfer of the printing order to bistable element SAPA of printing control GOS (FIG. 6). The bistable element SAPA renders operative in turn the bistable element IESA which, through the medium of the controlling logic network CGS Of the printing and tabulating control GOS, transmits to the internal operations control GOI on channel Y a signal adapted to indicate the engagement of printing control GOS and prevent following macroinstructions starting fresh printing instructions until the current instruction is completed. The same bistable element SAPA renders operative, through the medium of logic network CGS, bistable element COSA which engages by means of electromagnet ES the mechanical clutch controlling generation of the printing cycles.

The reading of the following cells of the program zone ZE01 carried out by the internal operations control GOI finds place 22 devoid of a code and place 23 coded with the character which selects the alphabetical keyboard.

Said character, transferred to register TAO (FIG. 5) in keyboard control GOT, commands corresponding electromagnet ET, which select the alphabetical and numerical keyboard, and electromagnet ECT, which effects the release of the keyboard. In this way, the printing and entry-from-keyboard cycles are made possible at the same time.

The striking of a key generates a character which remains available in keyboard microswitches M1...M8 to be transmitted to register RS of the printing and tabulation control. During the same striking cycle, keyboard microswitch MI is closed and transmits to keyboard control GOT signal ST2 adapted to indicate the availability of the character in keyboard microswitches M1...M8.

The transfer of the character to register RS is carried out with the first signal ST1 generated by the printing cycle and following the generation of the signal ST2.

Alphanumerical printing from the store is programmed in cells 7-10-13 and 21 of the program zone. The contents of cells 7-10-13 of program zone ZE01 produce the writing of the printing operation code in the leading cell of the zone of store LDR which is defined by the address located in cells 8–9, 11–12 and 14–15.

The contents of cell 21 are the printing function code which is transferred to bistable element SAPA of tabulation control GOS. This bistable element commands in turn the energization of bistable element IESA, which signals to control GOI the engagement of control GOS, and the bistable element COSA, which commands the starting of the printing cycles. During the cycle of store LDR following the generation of signal ST1, which accompanies each printing cycle, a search is made for the store zone with the printing operation code in the leading cell and there is transferred to register RS of printing control GOS the character identified by the tag bit B2 which scans the said zone of store LDR under the control of printing control GOS. The printing of the character located in register RS takes place by the known methods.

Numerical printing can take place only from a store zone with the printing operation code and may assume different formats in dependence on the programming of the macroinstruction.

For numerical printing, places 7–8–9, 10–11–12, 13–14–15, respectively, of the normal macroinstruction are used for heading data zone of store LDR with the printing operation code, place 21 is used to command the printing and place 22 is used to define the printing method.

The code contained in place 22 is adapted to specify whether the printing is to be:

1. direct from the store zone;
2. from the store zone with elimination of the zeros which precede the first significant digit;
3. from the store zone with the substitution of asterisks for the zeros which precede the first significant digit;
4. the store under the control of the printing subprogram located in zone ZE03, with or without the substitution of asterisks for the zeros which precede the first significant digit.

In the case of numerical printing direct from the store, place 22 of the macroinstruction does not contain any code character. The difference between numerical and alphabetical printing is established in this case by the presence in the zone of store LDR with the leading printing code of one or two beginning-of-zone bits B1 which respectively make possible at each mechanical printing cycle the transfer of one cell or of two successive cells of the store zone to register RS.

The code character in place 22 of the macroinstruction, which is adapted to define the method of numerical printing, is transferred to register CS of control GOS formed by three bistable elements SOZE, SAPO, and EDO.

In the case of numerical printing with elimination of nonsignificant zeros or with substitution of asterisks for the nonsignificant zeros, bistable elements SOZE and SAPO respectively are rendered operative. These act during each cycle relating to the printing of a nonsignificant zero contained in register RS, preventing the striking bistable element BATU from being rendered operative or forcing the asterisk character into the register RS through logic network CGS.

The energization of bistable element EDO defines a more complete control of the printing format. It is a characteristic of the computer than the printing of a line in which individual digits or groups of digits alternate with alphabetical characters or special symbols is performed under the control of a printing subprogram contained in a predetermined zone of the internal store of the computer. In consequence of a printing instruction with control of the printing format, the zone containing the printing subprogram is read sequentially and supplies commands adapted to transfer to the printing means numerical characters extracted from a store zone with a printing operation code and alphabetical characters extracted from the same store zone which contains the printing subprogram, the alternation of the two flows of data being controlled by the instruction of the printing subprogram.

A predetermined character located in cell 22 of the normal macroinstruction is adapted to render operative bistable element EDO of the register CS and to return to register EDA of control GOS the characters of the printing subprogram block contained in zone ZE03 of store LDR.

In zone ZE03, there follow one another cells containing alphabetical printing instructions adapted to command the transfer to register RS of an alphabetical character located in the two cells following each alphabetical printing instruction, and cells containing numerical printing instructions adapted to command the transfer to register RS of digits between one and four contained in the zone of store LDR with the printing operation code.

Each instruction of the printing subprogram is a character formed by four bits in binary code, of which that with the weight $2^0$ is used to distinguish the alphabetical instruction from the numerical instruction. In each numerical printing instruction, the bit with the factor $2^1$ is used to command the possible replacement of nonsignificant zeros by asterisks if the character read in cell 22 of the normal macroinstruction is adapted to render operative at the same time bistable elements EDO and SOZE of register CS, while the remaining bits with the factors $2^2$ and $2^4$ are adapted to define the length of the numerical printing.

The printing operations with control of the horizontal format begin, after the synchronization of the printing cycle with the cycle of store LDR, with the reading of the first cell of zone ZEO3 which contains an alphabetical or numerical printing instruction.

Under the control of the printing and tabulation control GOS, the character read in zone ZEO3 is transferred to register EDA of printing control GOS. If this character commands alphabetical printing, the alphabetical character which follows the instruction being examined is transferred to register RS and the reading of the zone of store LDR with the printing operation code is not effected. The printing of this alphabetical character is followed by the transfer of a fresh character of zone ZEO3 to register EDA. If this character commands numerical printing, one or more printing cycles are carried out, each of which transfers to register RS a digit extracted from the numerical zone of store LDR with the printing operation code.

After each transfer from said numerical zone, a count −1 is carried out in the counter formed by the two bistable elements of register EDA which contain the bits $2^2$ and $2^4$ of the instruction character. When this counter clears to zero, the transfers from the numerical zone to register RS are stopped and the reading of zone ZEO3 is resumed and produces the transfer of a fresh instruction of the subprogram to register EDA.

The end of the printing instruction with control of the horizontal format is produced by the reading of an instruction cell of zone ZEO3 which is devoid of the printing function code or by the completion of the reading of zone ZEO3 containing the printing subprogram.

The tabulation assembly comprises mechanical means adapted to receive a horizontal tabulation address which identifies one from among the 255 positions in the writing range and means adapted to carry out the positioning of the movable printing unit at the selected address.

The choice of the direction of movement and the duration thereof are defined by comparison between the address corresponding to the current position and the address corresponding to the new position of the movable printing unit, these addresses being stored by mechanical means commanded respectively by the position of the movable printing unit and by code bars controlled by electromagnets which receive the address code.

The horizontal tabulation address contained in places 2 and 3 of the normal macroinstruction is transmitted to the printing and tabulation control GOS with the reading of the corresponding cells 2 and 3 of program zone ZEO1.

This tabulation address is transferred to register RS of control GOS simultaneously with a command of the internal operations control GOI which produces the energization of bistable element VIT, which is adapted to signal to control GOI through logic network CGS the engagement of control GOS for a horizontal tabulation operation and to render operative and bistable element TABO which commands, by means of electromagnet EI, the execution of a first tabulation cycle. During this first tabulation cycle there is carried out the mechanical reading of eight code electromagnets ET1...ET8 commanded by the eight bistable elements of register RS and the tabulation address is transferred to mechanical store members.

The first cycle is followed by a second cycle, during which there take place the movement of the movable printing unit and the stopping thereof under the control of means adapted to make a comparison between the current address and that corresponding to the fresh command and to establish, in consequence of the comparison, the direction of movement and the duration of the movement of said movable unit. This tabulation movement positions the movable printing unit at the only like addresses of the writing range.

The stopping of the movable unit thereof takes place at a like address which, if it does not coincide with the tabulation address, is the address immediately preceding it.

The eventual completion of the positioning of the movable printing unit requires a third mechanical cycle during which the control GOS commands the step-by-step advance device used in the printing and prearranged through the bistable element AVAI and the corresponding electromagnet EA.

Paper Services

The paper services are provided by devices which command the feed of the following formats of paper in the printer S:

1. continuous roll;
2. continuous forms;
3. separate forms.

The writing range of printer S is divided into two parts each of which is provided with its own feed means for paper support.

More particularly, the platen is divided into two parts and it is possible to command the feed of two separate continuous rolls by causing the respective feed rollers to press against the two sections of the platen.

To the two sections of the platen there moreover correspond two separate continuous forms each of which is caused to advance by an individual device formed by a toothed wheel engaging in the lateral holes in the form.

Similarly, there is the possibility of introducing a separate form into each of the two parts of the writing range, this form being fed under the action of the same rollers which produce the movement of the corresponding continuous roll.

Only line-spacing feed or advance is provided for the continuous roll and the separate form, while a line-spacing feed movement and a feed movement with a paper jump are possible for the continuous forms. The length of the jump may be controlled in each of the two feed devices for the continuous forms by a band of plastic sheet material closed in a loop and perforated in five tracks. Four of these tracks are used for the perforations which reproduce the vertical composition of the form, while the fifth track is used for perforations signalling the end of the sheet, which produce the jump and the repositioning of the form.

The feed of the form is synchronous with the advance of the perforated band. The band slides below a photoelectric device adapted to be selected for each of the four tracks and which, by identifying the prearranged perforations, causes stopping of the jump.

The four feed devices which act respectively on the two continuous forms and on the two continuous rolls (or separate forms, respectively) are controlled by four paper controls TI, TS, RD, and RS which form part of the paper services control GSC (FIG. 8). The characters located in places 4–5–6 of the normal macroinstruction control the feed devices of the support in the four paper controls. More particularly, the character read in cell 4 of program zone ZEO1 is transferred to control GSC, where it renders operative one or more than one of four bistable elements R*d*, R*s*, T*s*, and T*i* (identified by their output lines in FIG. 8) in accordance with 15 different combinations corresponding to 15 different codes of the character.

Each of the bistable elements R*d*, R*s*, T*s*, and T*i* forms part respectively of control RD for the right-hand platen, control RS for the left-hand platen, control TS for the upper feed means and control TI for the lower feed means, and is adapted to select, by means of a corresponding electromagnet, the device for the feed, respectively, of the right-hand continuous roll, the left-hand continuous roll, the right-hand continuous forms and the left-hand continuous forms.

The character read in cell 5 of the program zone ZEO1 is transferred to the four bistable elements F1, F2, F3, and F4 of the paper services control GSC and is adapted to select one of the four tracks *p*1, *p*2, *p*3, and *p*4 of the two paper jump devices and to render operative in paper control TI or TS selected by the character read in cell 4 of program zone ZEO1, the corresponding bistable element CS1 or CS2 which commands the prearrangement of the paper jump in the respective feed device for the paper.

Each of the bistable elements CS1 and CS2 commands prearrangement of the paper jump by means of an electromagnet which positions mechanical members in such manner as to convert a following line-spacing command into a paper jump command.

The character read in cell 6 of program zone ZEO1 is transferred to register F of control GSC and is adapted to render the bistable elements VIGO, INT, AR, and RIT operative through logic network CGSC to command, respectively, the execution of the mechanical cycle of performance of paper services, line-spacing, the opening of the rollers pressing on the platen and the positioning of the device for introducing separate forms.

More particularly, bistable element VIGO commands an electromagnet which produces the execution of a mechanical cycle of the paper services, while bistable elements INT, AR and RIT command, by means of respective electromagnets, the prearranged of mechanical means for the respective functions which will be performed during the cycle.

The energization of bistable elements VIGO and INT only, which is produced by the reading of the character with the symbol code INT, commands the line-spacing on the feed device selected and in particular the paper jump on the upper and lower feed means if they are already prearranged for the paper jump.

The energization of bistable elements VIGO, INT, and AR, which is produced by the reading of the character with the symbol code INT–AR, is adapted to command the line-spacing and the paper jump only on the feed devices for the continuous forms by opening of the feed rollers pressing on the platen.

The energization of bistable elements VIGO, AR, and RIT, which is produced by the reading of the character with the symbol code AR, commands in the feed device for the continuous sheet that is selected, the opening of the rollers and the positioning of the device for introducing separate forms to permit the introduction of these forms.

The energization of bistable element INT only, which is produced by the reading of the character with the symbol code TRC–INT, prearranges the selected feed device for line-spacing or for the paper jump.

The energization of bistable elements INT, AR, which is produced by the reading of the character with the symbol code TRC–INT–AR, is adapted to prearrange only the feed devices for the continuous forms for line-spacing or for the paper jump by opening of the rollers pressing on the platen.

The carrying out of the line-spacing or paper jump command is effected by transmission to the paper services control GSC of the character "T*rc*" for return to the beginning.

The return-to-beginning character "T*rc*" is transmitted to control GSC from the keyboard during the printing which accompanies the entry of characters from the alphanumerical keyboard, or from store LDR during the printing of a zone of store LDR with the printing operation code in the leading cell.

The character "T*rc*" produces the energization of bistable element VISA and, therefore, the execution of a mechanical cycle of the paper services, which performs the line-spacing or paper jump functions already prearranged. The same character "T*rc*" renders operative bistable element TABO which commands the positioning of the movable printing means at the last horizontal tabulation position.

I claim:

1. An electronic computer for executing a program made up of a series of fixed length macroinstructions, each of which includes a plurality of instructions for controlling the operation of said computer, comprising:

first memory means for storing the macroinstruction presently under execution, said first memory means having a predetermined set of segments, and means for interpreting the portion of the macroinstruction stored in the predetermined set of segments for controlling the performance of a plurality of predetermined operations in the execution of the program, the portion of the macroinstructions stored in each of the segments controlling the performance of a predetermined one of the predetermined operations, said interpreting means being responsive to the respective positions occupied by said segments within said first memory means for controlling the performance of the predetermined operations.

2. An electronic computer for executing a program made up of a series of fixed length macroinstructions each of which includes a plurality of instructions for controlling the operation of said computer, comprising:

first memory means for storing the macroinstruction presently under execution, said first memory means having a predetermined set of segments, means for interpreting the portion of the macroinstruction stored in the predetermined set of segments for controlling the performance of a plurality of predetermined operations in the execution of the program, the portion of the macroinstruction stored in each of the segments controlling the performance of a predetermined one of the predetermined operations, second memory means having a plurality of addressable locations for storing the macroinstructions of the program, and means responsive to the portion of the macroinstructions stored in a predetermined one of said segments of said first memory means as interpreted by said interpreting means for transferring the macroinstructions stored in a selected one of said addressable locations to said first memory means in place of said present macroinstruction, after completion of the execution of the rest of said present macroinstruction.

3. An electronic computer for executing a program made up of a series of fixed length macroinstructions having a labeled portion, each of which macroinstructions includes a plurality of instructions for controlling the operation of said computer, comprising:

first memory means for storing the macroinstruction presently under execution, and having a predetermined set of segments, means for interpreting the portion of the macroinstructions stored in the predetermined set of segments for controlling the performance of a plurality of predetermined operations in the execution of the program, the portion of the macroinstructions stored in each of the segments controlling the performance of a predetermined one of the predetermined operations, and means for providing an indication of the label portion of the macroinstruction presently under execution, the interpreting means being responsive to the indication for interpreting the portions of the macroinstructions stored in different predetermined set of segments of said first memory means for controlling the performance of different predetermined operations depending on the identity of said labeled portion.

4. An electronic computer for executing a program made up of a series of fixed length macroinstructions each of which includes a plurality of instructions for controlling the operation of said computer, comprising first memory means for storing the macroinstructions presently under execution, said first memory means having a predetermined set of segments, means for interpreting the portion of the macroinstructions stored in the predetermined set of segments for controlling the performance of a plurality of predetermined operations, in the execution of the program, the portion of the macroinstructions stored in each of the segments controlling the performance of a predetermined one of the predetermined operations, second memory means having a plurality of addressable locations for storing the macroinstructions of the program, and means responsive to the result of a previous operation in the execution of the program and the portion of the macroinstructions stored in a predetermined one of said segments of the first memory means for transferring the macroinstructions stored in a selected one of a selected plurality of said addressable locations to said first memory means in place of the present macroinstruction, after completion of the execution of the rest of the present macroinstructions.

5. The electronic computer as recited in claim 2 further comprising:

means containing a plurality of addressable locations for storing fixed and variable length segments of information for being operated upon by the macroinstruction stored in said first memory means, means for transferring a fixed or variable length segment of information between a selected location in the second memory means and a selected location of the means for storing fixed and variable length segments of information.

6. An electronic computer for executing a program made up of a series of instructions comprising:

first memory means for storing the program to be executed and data to be operated upon by the program, operational memory means being divisible into a plurality of register means for storing the instruction presently under execution, data and arithmetic and logical operands, means for transferring instructions and data between said first memory means and said operational memory means, and means responsive to the insertion of a selected one of a plurality of division instructions into the operational memory means for dividing the operational memory into a particular grouping of the register means, the division of the operational memory means being variable in number and size at any time during the execution of the program upon the insertion of a different division instruction into the operational memory means.

7. An electronic computer for executing a program made up of a series of instructions, comprising:

memory means being divisible into a plurality of zones, said zones being capable of storing information in the nature of an instruction presently under execution, data, arithmetic operands and results, means for interpreting said stored information in accordance with the zone in which it is stored, said interpreting means being connected to said memory means, and means connected to said memory means and responsive to the presence of one of a plurality of division instructions in the memory means for dividing the memory means into a particular grouping of the zones, the division being variable at any time during the execution of the program upon the insertion of a new division instruction into the memory means.

8. The electronic computer as recited in claim 7 wherein the dividing means operates to divide the memory means into the zones by recording a beginning-of-zone signal at the beginning of each of the zones, the signal being alike for all the zones and further comprising:

means responsive to the insertion of a heading instruction into the memory means for identifying a selected zone for use in a predetermined operation by recording a predetermined heading code at the beginning of the selected zone, the zone being identified in later operations by the recognition of the heading code.

9. An electronic computer for executing a program comprising a series of instructions comprising:

operational memory means for storing data and arithmetic operands and results, means for serially reading the instructions of said program from said memory means, means responsive to the reading of a division instruction by the reading means for subdividing the memory means into a plurality of zones by recording a beginning-of-zone signal at the beginning of each of the zones, the signals being alike for all of the zones, and means responsive to the reading of a heading instruction by the reading means for identifying a selected zone for use in a predetermined operation by recording a predetermined heading code at the beginning of the selected zone, the zone being identified in later operations by the recognition of said heading code.

10. The electronic computer as recited in claim 9 wherein the memory means includes a cyclic memory and further comprising:

means responsive to the reading of a heading instruction by the reading means for recording the heading code at the end of the selected zone.

11. The electronic computer as recited in claim 9 further comprising:

means for reading the instructions in said selected zone and performing the predetermined operation, and means for erasing the heading code after completion of the predetermined operation.

12. The electronic computer as recited in claim 9 further comprising:

at least one peripheral unit having a control unit, each control unit including means for transferring information between the associated peripheral unit and a zone of the memory means headed with a predetermined heading code, means responsive to the reading of an instruction for controlling a selected one of the at least one peripheral unit by the reading means for transferring the instruction to the control unit of the relevant peripheral unit for causing the control unit to control the relevant peripheral unit in accordance with the transferred instruction, means responsive to the reading of the other instructions of the program for executing the instructions, the execution of instructions following a peripheral unit control instruction being overlapped in time with execution of the peripheral unit control instruction only if execution of the following instructions require use of separate portions of the computer in the execution of the peripheral unit control instruction.

13. An electronic computer for serially executing a program made up of a series of instructions comprising:

a cyclic memory subdivided into a plurality of addressable zones, at least one peripheral unit having an associated control unit, and a main control unit including:

means for serially reading the instructions of the program from the cyclic memory, means responsive to the reading of a heading instruction for heading a selected zone of the memory with a heading code for designating the selected zone for a selected operation, means controlled by the reading means for transferring an instruction for controlling said at least one peripheral unit to the associated control unit for causing the latter to control the associated peripheral unit in accordance with the said transferred instruction, each peripheral unit control unit each including means for transferring information between the associated peripheral unit and the zone of the memory headed with a predetermined heading code, means controlled by the reading means for executing the other of the instructions of the program as they are read by the reading means, the execution of a instruction following an instruction for controlling said at least one peripheral unit being overlapped in time with execution by the associated control unit of the instruction for controlling the associated peripheral unit only if they require the use of separate portions of the computer for their execution.

14. An electronic computer for serially executing a program comprising a series of instructions comprising:
a printer,
a cyclic memory having a plurality of zones, a predetermined one of the zones being reserved for storing a printing subroutine including a series of instructions for controlling the horizontal format of said printer,
means connected to said memory for indicating the instruction presently under execution by the computer,
means responsive to the indication of a predetermined heading instruction for recording a heading code in the beginning of a selected one of the zones for designating said selected zone as containing data characters to be printed,
means responsive to the indication of a print instruction for serially reading the instructions of the printing subroutine from the predetermined zone,
means responsive to the reading of a first type instruction from the printing subroutine for transferring a selected data character from the zone headed by said heading code to the printer for being printed and responsive to the reading of a second type of instruction from the predetermined zone to the printer for being printed, the instructions of the first and second types being interspersed in any desired order in the printing subroutine.

15. An electronic computer, comprising:
a cyclic memory for storing a plurality of information words each including a variable plurality of *n* bit characters and be divisible into a plurality of zones, a predetermined one of the zones containing a pair of numerical words interlaced character by character, the corresponding characters of the words being adjacent to each other,
a serial to parallel converter having *n* outputs and an input coupled to the output of the cyclic memory for successively making simultaneously available at its outputs the *n* bits of the characters,
a parallel to serial converter having *n* inputs and an output coupled to the input of the cyclic memory for receiving the *n* bits of a character in parallel and entering them serially into the delay line,
at least two cascaded *n* bit registers connected between the outputs of the serial to parallel converter and the input of the parallel to serial converter for successively making simultaneously available in the registers the successive corresponding characters of the numerical words of the predetermined zone, and
means for performing, within a single cycle of the memory character by character arithmetic operations on the successive characters of the arithmetic words stored in the predetermined zone as the corresponding characters of the words are made available in the cascaded registers.

16. In an electronic computer including a memory having a plurality of zones, the combination comprising:
a tape unit including a continuous loop of magnetic tape for storing information, the tape containing at least one information track and an address track for storing addresses of locations on the at least one information track, each of the addresses identifying an equal portion of each information track; and means for reading and writing information on the at least one information track, and
means for selectively transferring, by way of the reading and writing means, a block of information between a selected zone of the memory and a selected one of the portions of a selected information track, the capacity of said portion having a maximum size equal to the capacity of the selected zone.

17. An electronic computer, comprising:
a memory having a plurality of zones,
a magnetic tape cartridge including a loop of magnetic tape having at least one continuous information track and an address track,
means for reading and writing information on the tracks, and
means for selectively transferring by way of the reading and writing means a block of information between a selected memory zone and a selected portion of a selected one of the tracks, the said portion having a maximum size equal to the capacity of the selected zone.

18. The electronic computer as recited in claim 17 wherein the address track on the magnetic cartridge tape loop is parallel to the at least one information track, the address track bearing a plurality of addresses each designating an equal portion of each information track.

19. The electronic computer as recited in claim 17 wherein the selective transferring means includes;
a register means for storing the address of the selected portion on the tape loop,
means responsive to the address stored in the register means for positioning the beginning of the selected portion of the information track proximate the reading and writing means and for enabling the reading and writing means and for enabling the reading and writing means to transfer information between the memory and the selected track.

20. A stored program electronic computer comprising:
a memory having an operational portion and a program storing portion,
means for transferring selected program instructions from the program storing portion to the operational portion for execution in the carrying out of the program, and
means responsive to predetermined instructions in the operational portion for causing said transferring means to transfer different instructions depending on the occurrence of preselected jump conditions.

21. A stored program electronic computer comprising:
means for serially interpreting and executing the instructions of the stored program,
a magnetic tape cartridge program memory interchangeably coupled to said interpreting and executing means, and
means for transferring the instructions of the program from the memory to the interpreting and executing means, said transferring means being responsive to the interpreting of a jump instruction for next transferring different instructions depending on the occurrence of a corresponding jump condition.

22. The computer according to claim 20 wherein said program storing portion comprises an interchangeable magnetic tape cartridge.